(12) United States Patent
Wu et al.

(10) Patent No.: US 12,520,337 B2
(45) Date of Patent: Jan. 6, 2026

(54) POWER CONTROL METHOD, DEVICE AND STORAGE MEDIUM FOR SIDELINK COMMUNICATION SYSTEM

(71) Applicant: Samsung Electronics Co., Ltd., Suwon-si (KR)

(72) Inventors: Min Wu, Beijing (CN); Miao Zhou, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 17/600,580

(22) PCT Filed: Aug. 14, 2020

(86) PCT No.: PCT/KR2020/010838
§ 371 (c)(1),
(2) Date: Sep. 30, 2021

(87) PCT Pub. No.: WO2021/029728
PCT Pub. Date: Feb. 18, 2021

(65) Prior Publication Data
US 2022/0183017 A1 Jun. 9, 2022

(30) Foreign Application Priority Data

Aug. 14, 2019 (CN) .......................... 201910750415.3
Aug. 27, 2019 (CN) .......................... 201910797001.6
(Continued)

(51) Int. Cl.
H04W 72/542 (2023.01)
H04B 7/06 (2006.01)
(Continued)

(52) U.S. Cl.
CPC ...... *H04W 72/542* (2023.01); *H04B 7/06954* (2023.05); *H04L 5/0051* (2013.01);
(Continued)

(58) Field of Classification Search
CPC .... H04W 72/20; H04W 72/546; H04W 72/56
See application file for complete search history.

(56) References Cited

U.S. PATENT DOCUMENTS

| 11,943,648 B2* | 3/2024 | Lee .................. H04L 5/0048 |
| 2012/0257515 A1* | 10/2012 | Hugl .................. H04W 24/10 370/252 |

(Continued)

FOREIGN PATENT DOCUMENTS

| CN | 102549997 A | 7/2012 |
| CN | 104662945 A | 5/2015 |

(Continued)

OTHER PUBLICATIONS

U.S. Appl. No. 62/828,444 (Year: 2019).*
(Continued)

*Primary Examiner* — Yemane Mesfin
*Assistant Examiner* — Jia Hao Deng

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method performed by a first terminal is provided, the method comprising: transmitting, to a second terminal, sidelink control information (SCI) includes information field
(Continued)

associated with a request of sidelink channel state information (CSI); transmitting, to the second terminal, a sidelink channel state information reference signal (CSI-RS) in response to the information field indicating request of the sidelink CSI; receiving, from the second terminal, the sidelink CSI obtained based on the sidelink CSI-RS.

12 Claims, 6 Drawing Sheets

(30) Foreign Application Priority Data

Oct. 12, 2019 (CN) .................. 201910969943.8
Feb. 13, 2020 (CN) .................. 202010090789.X
Aug. 14, 2020 (KR) .................. 10-2020-0102157

(51) Int. Cl.
  *H04L 5/00* (2006.01)
  *H04W 72/20* (2023.01)
  *H04W 72/56* (2023.01)
  *H04W 80/02* (2009.01)

(52) U.S. Cl.
  CPC .......... *H04W 72/20* (2023.01); *H04W 72/56* (2023.01); *H04W 80/02* (2013.01)

(56) References Cited

U.S. PATENT DOCUMENTS

| | | | |
|---|---|---|---|
| 2013/0208678 A1 | 8/2013 | Zhang | |
| 2015/0244444 A1 | 8/2015 | Mazzarese et al. | |
| 2016/0295574 A1 | 10/2016 | Papasakellariou | |
| 2017/0223695 A1 | 8/2017 | Kwak et al. | |
| 2018/0206176 A1 | 7/2018 | Panteleev et al. | |
| 2018/0310298 A1 | 10/2018 | Li et al. | |
| 2018/0324039 A1* | 11/2018 | Jin | H04L 5/0048 |
| 2019/0159100 A1* | 5/2019 | Liou | H04B 7/088 |
| 2019/0387377 A1 | 12/2019 | Zhang et al. | |
| 2022/0014338 A1* | 1/2022 | Yoshioka | H04W 8/005 |

FOREIGN PATENT DOCUMENTS

| | | |
|---|---|---|
| CN | 107683575 A | 2/2018 |
| CN | 109121209 A | 1/2019 |

OTHER PUBLICATIONS

Communication pursuant to Article 94(3) EPC dated Apr. 24, 2023, in connection with European Application No. 20852312.6, 5 pages.
First Office Action dated Apr. 10, 2023, in connection with Chinese Application No. 202010090789.X, 9 pages.
Notification of Fulfilling of Registration Formality dated Sep. 26, 2023, in connection with Chinese Application No. 202010090789.X, 6 pages.
Examination report dated Nov. 24, 2023, in connection with Indian Application No. 20212704488, 7 pages.
Huawei, et al., "Correction on MAC procedure and FRX related issues," R2-165827, 3GPP TSG-RAN WG2 Meeting #95, Gothenburg, Sweden, Aug. 22-26, 2016, 9 pages.
European Patent Office, "Supplementary European Search Report" issued Jan. 18, 2022, in connection with European Patent Application No. 20852312.6, 11 pages.
Ericsson "On SCI formats", 3GPP TSG-RAN WG1 Meeting #94bis, R1-1813649, Chengdu, China, Oct. 8-12, 2018, 2 pages.
Intel Corporation, "Physical layer procedures for NR V2X sidelink communication", 3GPP TSG RAN WG1 Meeting #97, May 13-17, 2019, R1-1906799, 14 pages.
Ericsson, "PHY layer procedures for sidelink", 3GPP TSG-RAN WG1 Meeting #97, May 13-17, 2019, R1-1907143, 12 pages.
Huawei et al., "Sidelink physical layer procedures for NR V2X", 3GPP TSG RAN WG1 Meeting #97, R1-1906008, 23 pages.
Kyocera, "Physical Layer Procedures for CSI acquisition in unicast transmissions", 3GPP TSG-RAN WG1#97, R1-1907103, 3 pages.
International Search Report dated Nov. 20, 2020 in connection with International Patent Application No. PCT/KR2020/010838, 3 pages.
Written Opinion of the International Searching Authority dated Nov. 20, 2020 in connection with International Patent Application No. PCT/KR2020/010838, 4 pages.
European Search Report dated Jan. 27, 2025, in connection with European Patent Application No. 24203581.4, 9 pages.
LG Electronics, "Feature lead summary for agenda item 7.2.4.5 Physical layer procedures for sidelink," R1-1907682, 3GPP TSG RAN WG1 #97, Reno, USA, May 13-17, 2019, 26 pages.

* cited by examiner

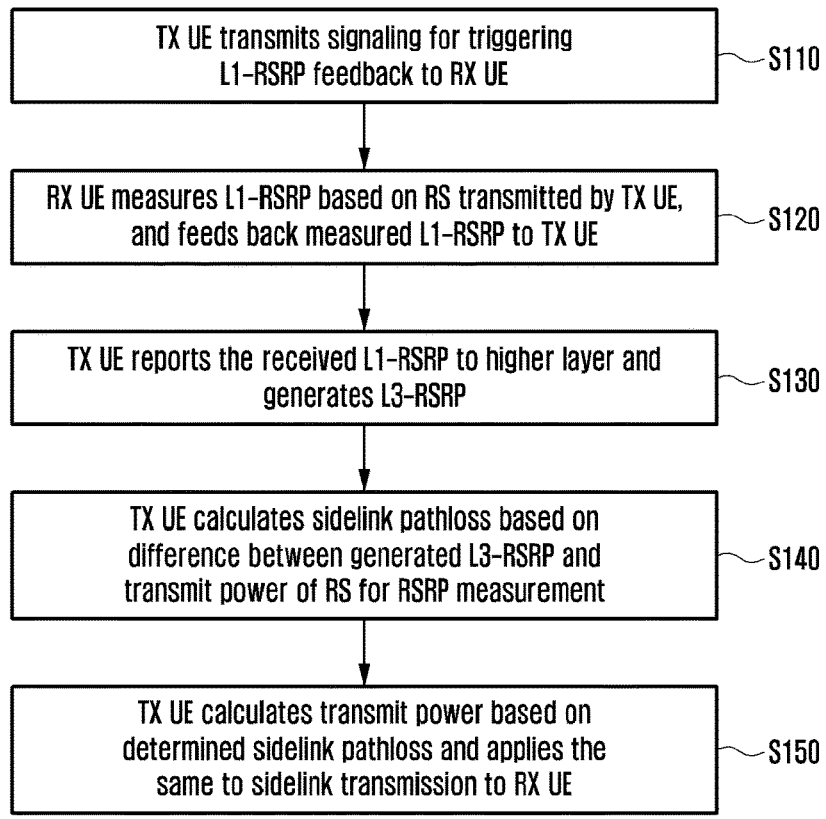

[Fig. 3C]

| R | quantized value of reference L1-RSRP |
|---|---|
| differential quantized value #1 comparing with reference quantized value | differential quantized value #2 comparing with reference quantized value |
| differential quantized value #3 comparing with reference quantized value | corresponding slot position of measurement of reference L1-RSRP |
| corresponding slot position of measurement of Differential L1-RSRP #1 | corresponding slot position of measurement of Differential L1-RSRP #2 |
| corresponding slot position of measurement of Differential L1-RSRP #3 | R |

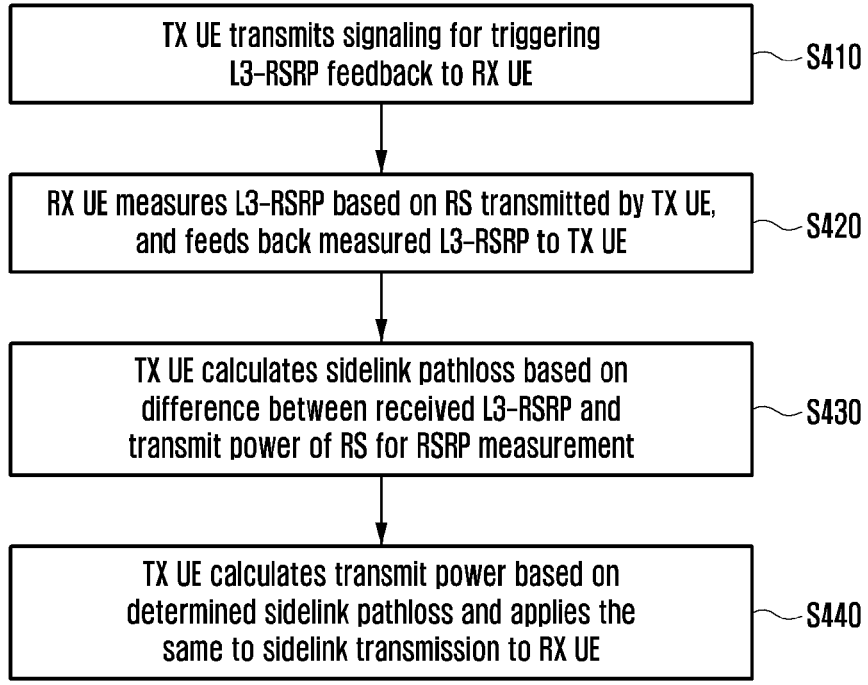

[Fig. 4]

[Fig. 5A]
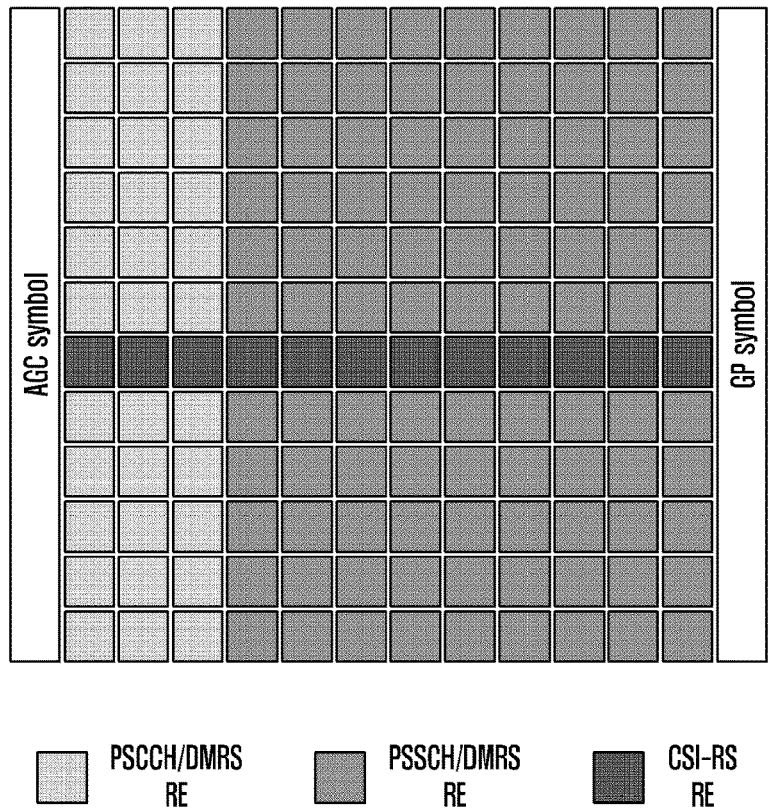
[Fig. 5B]
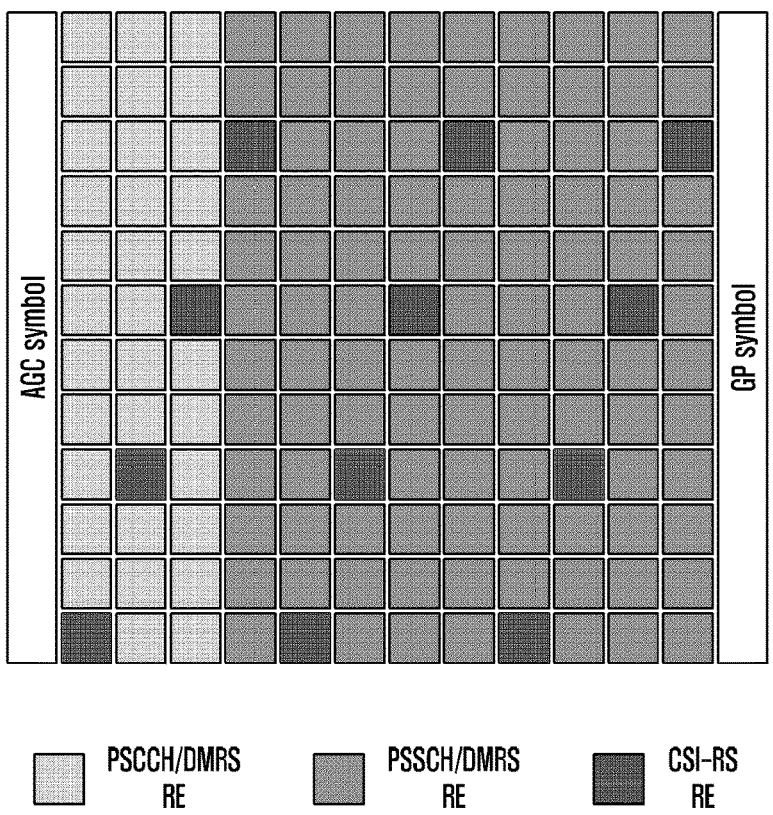

[Fig. 5C]
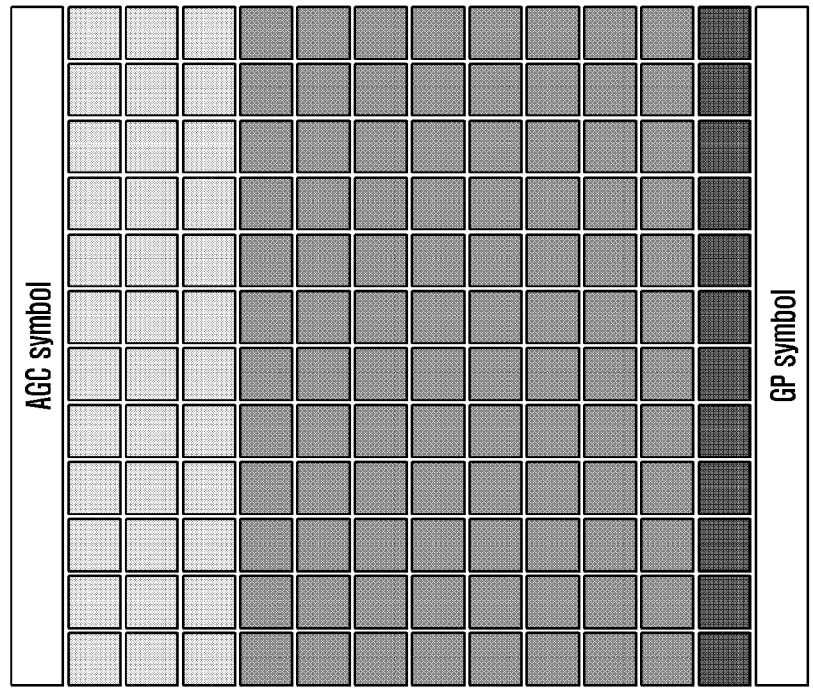
[Fig. 6]
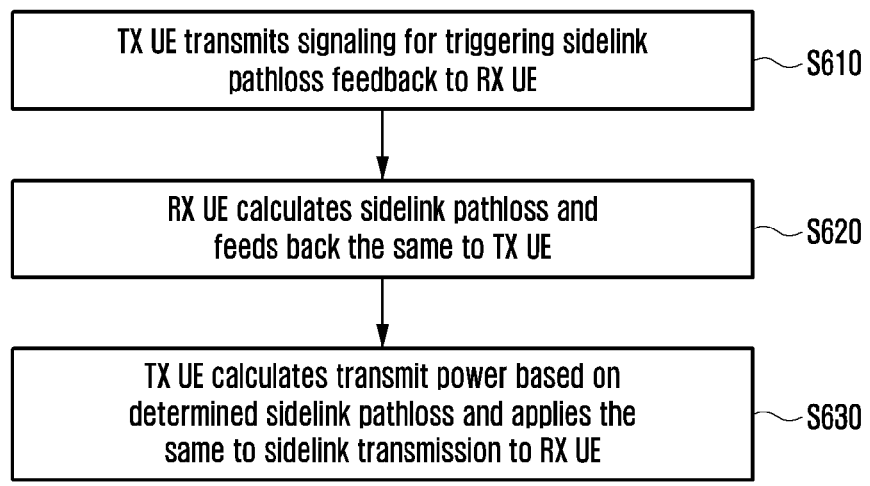

[Fig. 7]
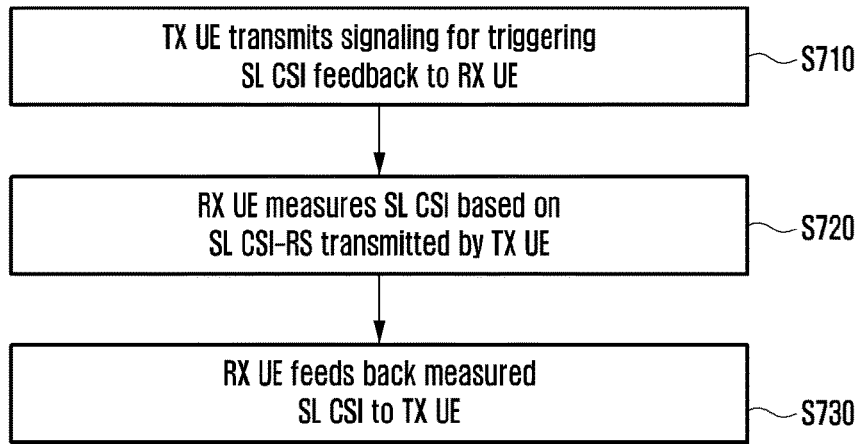
[Fig. 8]
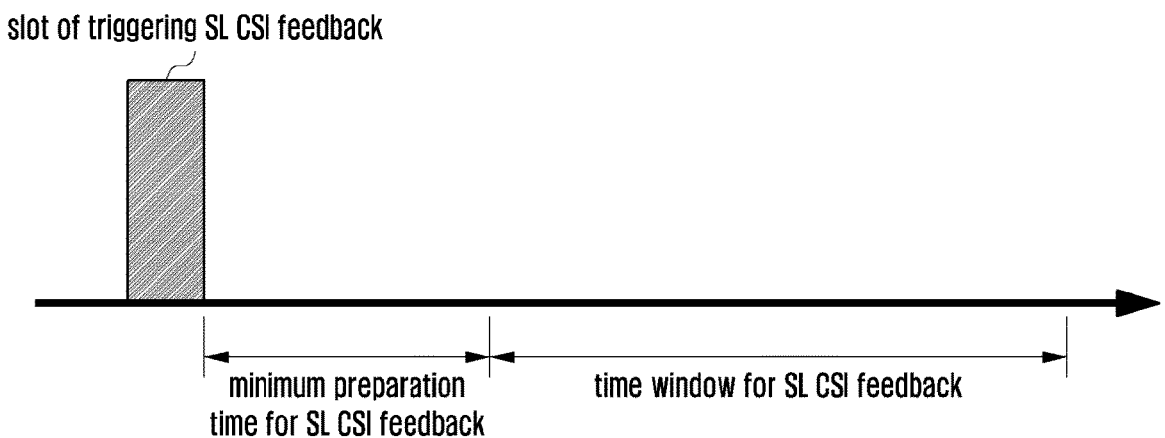
[Fig. 9A]
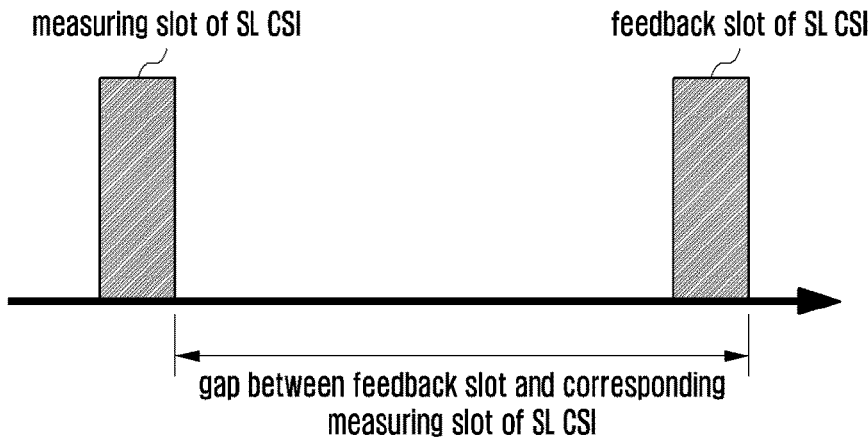

[Fig. 9B]
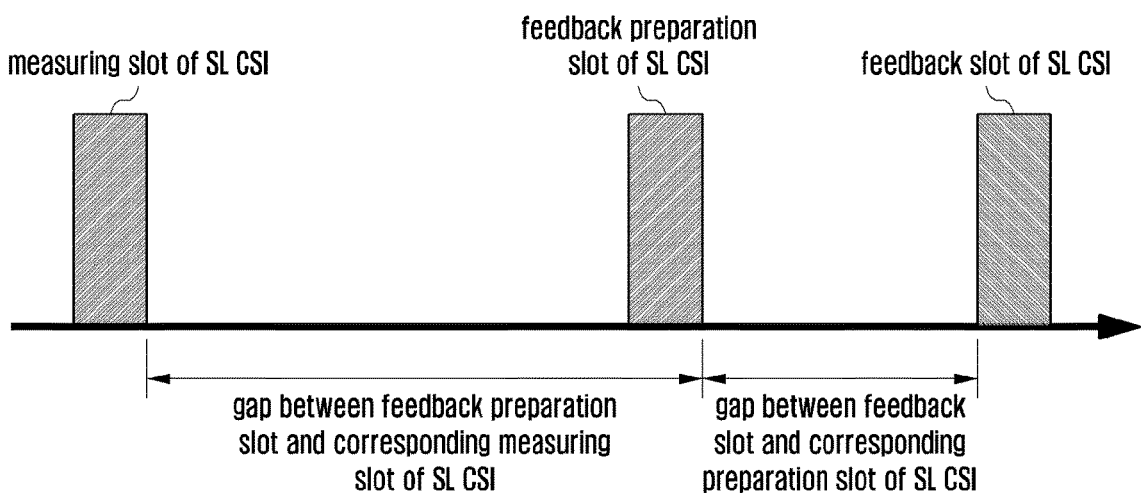

POWER CONTROL METHOD, DEVICE AND STORAGE MEDIUM FOR SIDELINK COMMUNICATION SYSTEM

CROSS-REFERENCE TO RELATED APPLICATIONS

This application is a 371 of International Application No. PCT/KR2020/010838 filed on Aug. 14, 2020, which claims priority to Chinese Patent Application No. 201910750415.3 filed on Aug. 14, 2019, Chinese Patent Application No. 201910797001.6 filed on Aug. 27, 2019, Chinese Patent Application No. 201910969943.8 filed on Oct. 12, 2019, Chinese Patent Application No. 202010090789.X filed on Feb. 13, 2020 and Korean Patent Application No. 10-2020-0102157 filed on Aug. 14, 2020, the disclosures of which are herein incorporated by reference in their entirety.

BACKGROUND

1. Field

The present disclosure relates to communication technology and a power control method for NR V2X in a communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A direct communication link between a User Equipment (UE) to another UE is called Sidelink (SL) in 3GPP LTE standards. Similar with Downlink (DL) and Uplink (UL), a control channel(s) and a data channel(s) also exist on the SL, wherein the former is called Physical Sidelink Control Channel (PSCCH) and the latter is called Physical Sidelink Shared Channel (PSSCH). The PSCCH is used to indicate information on time domain and frequency domain resource positions, modulation and coding scheme, etc., of the PSSCH transmission, and the PSSCH is used to carry data.

In a 3GPP 5G New Radio (NR) system, V2X is one of Working Items (WIs) of the Rel-16 NR standard. In the NR V2X system, in order to support more types of data services, the sidelink communication also needs to support groupcast transmission (that is, the sidelink physical channel transmitted by the UE is received and decoded by a group of UEs within a certain range) and unicast transmission (that is, the sidelink physical channel transmitted by the UE is received and decoded by another UE within a certain range), in addition to broadcast transmission. In order to decrease the interference between UEs in the sidelink system, both the groupcast and unicast transmissions may support calculating transmit power based on sidelink pathloss between two UEs, but no specific solution has been proposed.

The present disclosure proposes a corresponding solution(s) for one or more technical problems mentioned above.

SUMMARY

In order to overcome the technical problems described above or at least partly settle the technical problem described above, the following technical solutions are proposed:

According to an aspect of the present disclosure, a method performed by a first terminal in a communication system is provided, the method comprising: transmitting, to a second terminal, sidelink control information (SCI) includes information field associated with a request of sidelink channel state information (CSI); transmitting, to the second terminal, a sidelink channel state information reference signal (CSI-RS) in response to the information field indicating request of the sidelink CSI; receiving, from the second terminal, the sidelink CSI obtained based on the sidelink CSI-RS.

Preferably, the sidelink CSI is received via a medium access control (MAC) control element (CE).

Preferably, a priority of the MAC CE for the sidelink CSI is predefined value.

Preferably, the sidelink CSI includes a rank indicator (RI) and channel quality information (CQI) except for a precoding matrix indicator (PMI).

According to another aspect of the present disclosure, a method performed by a second terminal in a communication system, the method comprising: receiving, from a first terminal, sidelink control information (SCI) includes information field associated with a request of sidelink channel state information (CSI); receiving, from the first terminal, a sidelink channel state information reference signal (CSI-RS) in response to the information field indicating request of the sidelink CSI; transmitting, to the first terminal, the sidelink CSI obtained based on the sidelink CSI-RS.

According to still another aspect of the present disclosure, a first terminal in a communication system, the first terminal comprising: a transceiver; and a controller configured to: transmit, to a second terminal, sidelink control information (SCI) includes information field associated with a request of sidelink channel state information (CSI); transmit, to the second terminal, a sidelink channel state information reference signal (CSI-RS) in response to the information field indicating request of the sidelink CSI; receive, from the second terminal, the sidelink CSI obtained based on the sidelink CSI-RS.

According to still another aspect of the present disclosure, a second terminal in a communication system, the second terminal comprising: a transceiver; and a controller configured to: receive, from a first terminal, sidelink control information (SCI) includes information field associated with a request of sidelink channel state information (CSI); receive, from the first terminal, a sidelink channel state information reference signal (CSI-RS) in response to the information field indicating request of the sidelink CSI; transmit, to the first terminal, the sidelink CSI obtained based on the sidelink CSI-RS.

A method and device for transmitting channel state information reference signal (CSI-RS) and feeding back channel state information (CSI) to achieve an effect of link adaptation is provided.

BRIEF DESCRIPTION OF THE DRAWINGS

The above and/or additional aspects and advantages of the present invention will become apparent and easy to understand from the following description of embodiments with the attached drawings, wherein:

FIG. 1 illustrates a flowchart of a power control method for a sidelink communication system according to an embodiment of the present disclosure;

FIG. 2 illustrates a view of a MAC SE structure for indicating L1-RSRP according to the embodiment of the present disclosure;

FIGS. 3A-3C illustrate a view of a MAC SE structure for indicating a L1-RSRP of a plurality of slots according to the embodiment of the present disclosure;

FIG. 4 illustrates a flowchart of a power control method for a sidelink communication system according to another embodiment of the present disclosure;

FIGS. 5A-5C illustrate a diagram of pattern design for CSI-RS according to an embodiment of the present disclosure;

FIG. 6 illustrates a flowchart of a power control method for a sidelink communication system according to another embodiment of the present disclosure;

FIG. 7 illustrates a flowchart for the sidelink communication system to measure/feed back sidelink channel state information according to another embodiment of the present disclosure;

FIG. 8 illustrates a diagram of a time window for SL CSI feedback according to an embodiment of the present disclosure; and FIGS. 9A-9B illustrate a diagram for determining a measuring slot position corresponding to the SL CSI feedback according to an embodiment of the present disclosure.

DETAILED DESCRIPTION

The invention now will be described more fully hereinafter with reference to the accompanying drawings, in which embodiments of the invention are shown, wherein same or like reference numerals refer to same or like elements or elements having same or like functions throughout. Embodiments described below in connection with drawings are only illustrative and only aim to explain the present disclosure, which should not be constructed as limitations on the present invention.

As used herein, the singular forms "a", "an" and "the" are intended to include plural forms as well, unless the context clearly indicates otherwise. It will be further understood that the terms "comprises" and/or "comprising," or "includes" and/or "including" when used in this specification, specify the presence of stated feature(s), integer(s), step(s), operation(s), element(s), and/or component(s), but do not preclude the presence or addition of one or more other features, integers, steps, operations, elements, components, and/or groups thereof. It will be understood that when an element is referred to as being "connected to" or "coupled to" another element, it can directly be connected to or coupled to the other element or intervening elements may be present therebetween. Furthermore, as used herein, the terms "connected to" or "coupled to" may comprise wireless connection or wireless coupling. As used herein, the terms "and/or" comprise all or any one of one or more related items as listed, and their all combinations.

Those skilled in the art can understand that unless otherwise defined, all terms (including technical and scientific terms) used herein have the same meaning as commonly understood by one of ordinary skill in the art to which this invention belongs. It will be further understood that terms, such as those defined in commonly used dictionaries, should be understood as having a meaning that is consistent with their meaning in the context of the relevant art and the present disclosure, and will not be interpreted in an idealized or overly formal sense unless expressly so defined herein.

It could be understood by those skilled in the art that the "terminal" and "terminal equipment" used herein include not only device of a wireless signal receiver, which only has the device of wireless signal receiver without transmitting ability, but also device of receiving and transmitting hardware, which has the device of receiving and transmitting hardware capable of bidirectional communication on the bidirectional communication link. Such devices may include: cellular or other communication devices, which have single line display or multi lines display, or cellular or other communication devices without multi lines display; Personal Communications Service (PCS), which may combine voice, data processing, fax and/or data communication capabilities; PDA (Personal Digital Assistant), which may include a radio frequency receiver, a pager, internet/intranet access, web browser, note, calendar and/or a GPS (Global Positioning System) receiver; a conventional laptop and/or a handheld computer or other device having and/or including a radio frequency receiver. The "terminal" and "terminal equipment" used herein may be portable, transportable, installed in a vehicle (air, sea and/or land), or suitable and/or configured to operate locally, and/or in a distributed form, operate at any other location on earth and/or in space. The "terminal" and "terminal equipment" used here may also be a communication terminal, an internet terminal, an audio/video playing terminal, such as PDA, MID (Mobile Internet Device) and/or a mobile phone with audio/video playing function, or may also be smart TV, a set-top box and other devices.

Two sidelink communication mechanisms are defined in 3GPP LTE standard totally, that is, Device to Device (D2D) communication and a Sidelink-based Vehicle to Vehicle/Pedestrian/Infrastructure/Network (thereafter, referred to as V2X briefly). The latter has become the most typical sidelink communication technology in the current 3GPP LTE standards, since it is superior to the former in data rate, time delay, reliability and the like.

In view of resource allocation mechanism, current LTE V2X technique includes two modes in total, that is a sidelink resource allocation mode based on base station scheduling (Mode 3), which is referred to as centralized communication, and a sidelink resource allocation mode depending on UE's autonomous selection (Mode 4), which is referred to as distributed communication. Regarding the Mode 3, UE determines the sidelink resource for sidelink channel communication allocated by the base station by receiving downlink control channel of the base station, and mutual interferences among the sidelink resources for different UEs can be minimized by a reasonable scheduling strategy of the base station. Regarding the Mode 4, the base station is not involved in specific sidelink resource allocation, and UE determines available sidelink resources by sensing the sidelink channels. Since the existing LTE V2X technique is mainly used to support broadcast transmissions when initially designed, currently Mode 3 and Mode 4 both employ broadcast transmission in physical layer, that is, the sidelink physical channel transmitted by a UE is received and decoded by all UEs within a certain range. In addition, for UEs In Coverage (IC), both Mode 3 and Mode 4 transmissions support power control, and a transmit power is calculated based on downlink pathloss between the UE and the base station of the cell in which the UE is camped.

Several specific embodiments would be explained below. In the following embodiments, a UE transmitting a sidelink physical data channel is referred to as a transmitting UE (TX UE) briefly, and a UE receiving the sidelink physical data channel is referred to as a receiving UE (RX UE) briefly.

In Embodiment One and Embodiment Two, the RX UE measures Layer 1 (L1) Reference Signal Received Power (RSRP) based on a Reference Signal (RS) transmitted by the TX UE, and feeds back the measured L1-RSRP to the TX UE. The TX UE generates Layer 3 (L3) RSRP based on the received L1-RSRP through higher layer filtering, and calculates sidelink pathloss between the TX UE and the RX UE based on the generated L3-RSRP and transmit power of the RS for RSRP measurement. That is, the TX UE is a performer for generating the L3-RSRP, and also a performer for calculating the sidelink pathloss between the TX UE and the RX UE.

In the Embodiment Two, the RX UE measures the L1-RSRP based on the RS transmitted by the TX UE, generates the L3-RSRP through the higher layer filtering based on the measured L1-RSRP, and feeds back the generated L3-RSRP to the TX UE. The TX UE then calculates the sidelink pathloss between the TX UE and the RX UE based on the received L3-RSRP and the transmit power of the RS for RSRP measurement. That is, the RX UE is the performer for generating the L3-RSRP, and the TX UE is the performer for calculating the sidelink pathloss between the TX UE and the RX UE.

In Embodiment Three, the TX UE signals the RX UE of the transmit power of the RS for RSRP measurement. The RX UE measures the L1-RSRP based on the RS transmitted by the TX UE, generates the L3-RSRP through the higher layer filtering based on the measured L1-RSRP, calculates the sidelink pathloss between the TX UE and the RX UE based on the generated L3-RSRP and the received transmit power of the RS for RSRP measurement, and feeds back the calculated sidelink pathloss to the TX UE. That is, the RX UE is the performer for generating the L3-RSRP, and also the performer for calculating the sidelink pathloss between the TX UE and the RX UE.

The L1-RSRP is a reference signal received power measured at the physical layer, which is affected by both large-scale fading and small-scale fading, and thus it could not be utilized in estimation of the pathloss directly. The physical layer should report the measured L1-RSRP to a higher layer (Radio Resource Control (RRC) layer), and the latter filters the measured L1-RSRPs within a period of time to generate the L3-RSRP. The RSRP higher layer filtering may be understood as a sliding average of the measured L1-RSRPs within the period of time to compensate effect of the small-scale fading, so that the generated L3-RSRP after filtering only includes effect of the large-scale fading. Therefore, only the L3-RSRP could be utilized in the calculation of the pathloss. The L1-RSRP may be referred to as physical layer RSRP briefly, and the L3-RSRP may be referred to as higher layer RSRP or RRC layer RSRP briefly.

Embodiment One: RX UE feeds back L1-RSRP to TX UE, TX UE generates L3-RSRP based on Received L1-RSRP In the Embodiment One, the RSRP fed back to the TX UE by the RX UE is the L1-RSRP, that is, the TX UE is the performer for generating the L3-RSRP by performing the RSRP higher layer filtering. The RX UE measures the RSRP based on the RS transmitted by the TX UE, and feeds back the measured L1-RSRP to the TX UE. The TX UE reports the received L1-RSRP to the higher layer, and the L3-RSRP is generated through the higher layer filtering of the L1-RSRP. The TX UE calculates the sidelink pathloss between the TX UE and the RX UE based on the generated L3-RSRP and the transmit power of the RS for RSRP measurement. Particularly, as illustrated in FIG. 1, the Embodiment One comprises steps as follows.

In step S110, the TX UE transmits a signaling for triggering feedback of the L1-RSRP to the RX UE.

In step S120, the RX UE measures the L1-RSRP based on the RS transmitted by the TX UE, and feeds back the measured L1-RSRP to the TX UE. Particularly, after receiving the signaling for triggering feedback of the L1-RSRP, the RX UE measures the L1-RSRP based on the RS transmitted by the TX UE and feeds back the measured L1-RSRP to the TX UE.

In step S130, the TX UE reports the received L1-RSRP to the higher layer and generates the L3-RSRP through the RSRP higher layer filtering. Particularly, after receiving the fed back L1-RSRP, the TX UE reports the L1-RSRP to the higher layer and generates the L3-RSRP by RSRP higher layer filtering of the received L1-RSRPs within a predetermined period of time.

In the step S130, when the TX UE is in coverage (IC) of cellular network, coefficient alpha of a RSRP higher layer filter used by the TX UE is preconfigured through a UE specific RRC signaling by a serving base station of a cell in which the TX UE locates; when the TX UE is out of coverage (OOC) of cellular network, the coefficient alpha of the RSRP higher layer filter used by the TX UE is preconfigured through sidelink higher layer parameters in a hard-coded manner.

In step S140, the TX UE calculates the sidelink pathloss between the TX UE and the RX UE based on the L3-RSRP generated in step S130 and the transmit power of the RS for measuring the RSRP.

In step S150, the TX UE calculates the transmit power based on the sidelink pathloss calculated in step S140 and applies the calculated transmit power to sidelink transmission to the RX UE. Herein, the sidelink transmission comprises PSCCH, the PSSCH, Physical Sidelink Feedback Channel (PSFCH), Sidelink Channel Information Reference Signal (SL CSI-RS) and/or Sidelink Phase Tracking Reference Signal (SL PTRS), etc.

Optionally, step S110 may be omitted. For example, if power control based on sidelink pathloss is configured, after sidelink RRC connection between the TX UE and the RX UE is established, the RX UE should feed back the L1-RSRP to the TX UE continuously until the sidelink RRC connection between the TX UE and the RX UE is released. By means of this, signaling overhead for establishing the sidelink transmission between the TX UE and the RX UE may be reduced, which improves communication efficiency.

In power control methods in existing systems, transmit power of a reference signal for RSRP measurement for purpose of power control keeps unchanged. For example, in LTE system, transmit power of a CRS for RSRP measurement may remain unchanged, and a LTE base station may notify the UE of the transmit power of the CRS, and the UE determines a difference between the transmit power of the CRS and corresponding generated L3-RSRP as downlink pathloss. In NR system, transmit powers of SSB and CSI-RS for RSRP measurement may remain unchanged, and a NR base station signals the UE of the transmit powers of the SSB and the CSI-RS, and the UE determines a difference between the transmit power of the SSB/CSI-RS and corresponding generated L3-RSRP as the downlink pathloss.

In conclusion, the transmit power of the RS on which the L1-RSRP (namely, the L1-RSRPs measured within a predetermined period of time) for generating the L3-RSRP is based should remain unchanged generally. If the transmit power of the RS changes, the performer for generating the L3-RSRP must know an amount of change in the transmit power of the RS, and compensates the amount of change to corresponding measured L1-RSRP, then reports the compensated L1-RSRP to the higher layer, so as to ensure the transmit powers of the RS on which the L1-RSRPs, measured within the predetermined period of time, for generating the L3-RSRP is based are the same equivalently.

In the Embodiment One, the transmit power of the RS for RSRP measurement is not required to remain unchanged, since both the performers for transmitting the RS and for generating the L3-RSRP are the TX UE. Because the TX UE knows the amount of change in the transmit power of the RS, it may compensate to the corresponding measured L1-RSRP. However, in this case, the TX UE needs to know exactly a slot position on which the corresponding RS for RSRP measurement locates, for each L1-RSRP fed back by the RX UE, so it can know exactly the transmit power of corresponding RS.

Periodic/Semi-Persistent L1-RSRP Feedback

Since the L3-RSRP is generated based on a plurality samples of L1-RSRPs within the predetermined period of time, preferably, the TX UE should trigger a periodic L1-RSRP feedback by transmitting a signaling to the RX UE, and the RX UE should feed back the L1-RSRP to the TX UE periodically after receiving the signaling.

The TX UE may trigger the periodic L1-RSRP feedback by the RX UE via an explicit signaling. For example, the TX UE transmits a sidelink RRC signaling to the RX UE to trigger (configure) the periodic L1-RSRP feedback. Alternatively, the TX UE transmits the sidelink RRC signaling to the RX UE to configure a plurality of period values of the L1-RSRP feedback, and transmits a MAC CE signaling to the RX UE to trigger the periodic L1-RSRP feedback with one of the plurality of period values of the L1-RSRP feedback. In order to distinguish the periodic L1-RSRP feedback triggered by the MAC CE signaling from the periodic L1-RSRP feedback triggered by the sidelink RRC signaling, the former is referred to as semi-persistent L1-RSRP feedback while the latter is referred to as periodic L1-RSRP feedback, a difference thereof is a manner of triggering signaling. The system may support the periodic L1-RSRP feedback and/or the semi-persistent L1-RSRP feedback. After receiving the triggering (configuring) signaling for the periodic L1-RSRP feedback, the RX UE should perform the L1-RSRP feedback periodically, until it receives a corresponding sidelink RRC or MAC CE signaling for terminating the periodic L1-RSRP feedback.

The TX UE may also trigger the periodic L1-RSRP feedback by the RX UE via an implicit signaling. For example, if power control based on the sidelink pathloss is configured, after the sidelink RRC connection between the TX UE and the RX UE is established, the RX UE performs the periodic L1-RSRP feedback until the sidelink RRC connection between the TX UE and the RX UE is released.

Optionally, the period value of the L1-RSRP feedback is configurable, and the TX UE configures values including the period of the L1-RSRP feedback via the sidelink RRC signaling. Optionally, the period value of the L1-RSRP feedback is predetermined by the system, which can decrease the signaling overhead between the TX UE and the RX UE.

Optionally, it is assumed that the RS for RSRP measurement is transmitted periodically by the TX UE and the TX UE signals the RX UE of the period of the RS, the system specifies that the value of period at which the RX UE feeds back the L1-RSRP is the same as the value of period of the RS for RSRP measurement transmitted by the TX UE. That is, no explicit signaling for configuring the period of L1-RSRP feedback is needed, which decreases the signaling overhead between the TX UE and the RX UE.

Optionally, it is assumed that the RS for RSRP measurement is transmitted periodically by the TX UE, and the system specifies that the value of period at which the RX UE feeds back the L1-RSRP feedback is equal to or greater than the value of period of the RS for RSRP measurement transmitted by the TX UE. That is, the explicit signaling for configuring the period of L1-RSRP feedback is needed.

When the RS for RSRP measurement transmitted by the TX UE is periodic and the value of period at which the RX UE feeds back the L1-RSRP is greater than the value of period of the RS for RSRP measurement transmitted by the TX UE, or the RS for RSRP measurement transmitted by the TX UE is aperiodic, the RX UE may receive RSs for RSRP measurement transmitted several times by the TX UE during one period prior to a L1-RSRP feedback slot, then the RX UE may feed back the RSRP in any one of following methods.

Method 1: the RX UE feeds back the L1-RSRP measured on the RS in one closest slot, which is prior to the L1-RSRP feedback slot and within a predetermined gap, to the TX UE.

Method 2: the RX UE feeds back any one of the L1-RSRPs measured on a plurality of RSs, which are prior to the L1-RSRP feedback slot and within the predetermined gap, and indicates the RS in which slot the L1-RSRP is measured based on when feeding back the L1-RSRP.

Method 3: the RX UE feeds back an average of the L1-RSRPs measured on all RSs, which are prior to the L1-RSRP feedback slot and within the predetermined gap, to the TX UE.

Method 4: the RX UE feeds back all of L1-RSRPs measured on the all RSs, which are prior to the L1-RSRP feedback slot and within the predetermined gap, to the TX UE.

Herein, the predetermined gap is for preparation of the L1-RSRP feedback.

It is assumed that the RS for RSRP measurement transmitted by the TX UE is aperiodic and it cannot be ensured that the RS for RSRP measurement is transmitted at least once during each L1-RSRP feedback period. If the RX UE receives no RS for RSRP measurement transmitted by the TX UE during one period prior to the L1-RSRP feedback slot, the RX UE cannot measure the L1-RSRP and may skip the L1-RSRP feedback this time. That is to say, the periodic L1-RSRP feedback described above may be an intermittent periodic L1-RSRP feedback, instead of an absolutely continuous periodic L1-RSRP feedback.

In a Mode 1 based on centralized communication in the NR V2X, transmission resources for PSCCH/PSSCH are allocated by the base station uniformly. When the RX UE performs the periodic L1-RSRP feedback, the RX UE requests periodic sidelink resources for the L1-RSRP feedback from the severing base station in the cell at which it locates, and the base station may allocate the periodic sidelink resources for the L1-RSRP feedback of the RX UE. Alternatively, the TX UE requests the periodic sidelink resources for the L1-RSRP feedback of the RX UE from the severing base station in the cell at which it locates, and signals the RX UE of the periodic sidelink resources for the L1-RSRP feedback of the RX UE allocated by the base station.

In a Mode 2 based on distributed communication in the NR V2X, the transmission resources for PSCCH/PSSCH are allocated autonomously by the UE, and the UE selects available sidelink resources autonomously by channel sensing. When the RX UE performs the periodic L1-RSRP feedback, once the RX UE selects one available sidelink resource for the L1-RSRP transmission, it may periodically reserve the sidelink resource for subsequent L1-RSRP feedbacks. That is, the RX UE periodically reserves the same sidelink resource according to the value of L1-RSRP feedback period. Alternatively, the TX UE periodically reserves the same sidelink resource for the L1-RSRP feedback of the RX UE, and signals the RX UE of the reserved periodic sidelink resource for the L1-RSRP feedback of the RX UE.

Aperiodic (One-Shot) L1-RSRP Feedback

As a supplement to the periodic L1-RSRP feedback, the system can also support aperiodic L1-RSRP feedback. Herein, the aperiodic L1-RSRP feedback means a one-shot L1-RSRP feedback. That is, the TX UE triggers the one shot L1-RSRP feedback of the RX UE via a signaling. The TX UE should transmit trigger signaling multiple times if the TX UE requires the RX UE to feed back L1-RSRPs multiple times.

The TX UE may trigger the aperiodic L1-RSRP feedback to the RX UE via a Sidelink Control Information (SCI), for example, the SCI transmitted to the RX UE from the TX UE comprises 1 bit for triggering (requesting) the aperiodic L1-RSRP feedback. Optionally, the SCI transmitted to the RX UE from the TX UE would always comprise the 1-bit indication field regardless of whether the power control based on the sidelink pathloss is configured to be applied. The 1-bit indication field would be used to trigger (request) the aperiodic L1-RSRP feedback if the power control based on the sidelink pathloss is configured to be applied; while the 1-bit indication field would be reserved or used to indicate other information if the power control based on the sidelink pathloss is not configured to be applied. Optionally, the SCI transmitted to the RX UE from the TX UE would comprise the 1-bit indication field only when the power control based on the sidelink pathloss is configured to be applied; the SCI transmitted to the RX UE from the TX UE would not comprise the 1-bit indication field if the power control based on the sidelink pathloss is not configured to be applied. That is, payloads of the SCIs in these two cases are of different sizes, and the former is 1 bit more than the latter.

Optionally, when the TX UE triggers the aperiodic L1-RSRP feedback of the RX UE via the SCI, the RX UE should measure the RS for RSRP measurement transmitted from the TX UE in the current slot (namely, the slot in which the trigger signaling is), that is, the TX UE must transmit the RS for RSRP measurement in the slot where the L1-RSRP feedback is triggered. If the RS for L1-RSRP feedback is the SL CSI-RS (for the convenience of description, the SL CSI-RS is also referred to as CSI-RS briefly thereafter), the signaling for triggering the aperiodic L1-RSRP feedback in the SCI may implicitly indicate whether the CSI-RS is transmitted in the current slot. That is, when the SCI indicates the L1-RSRP feedback is triggered, it indicates implicitly that the CSI-RS is transmitted in the current slot. Alternatively, the signaling for indicating whether the CSI-RS is transmitted in the current slot in the SCI may trigger implicitly the aperiodic L1-RSRP feedback. That is, when the SCI indicates that the CSI-RS is transmitted in the current slot, it indicates implicitly triggering the L1-RSRP feedback.

Optionally, when the TX UE triggers the aperiodic L1-RSRP feedback of the RX UE via the SCI, the TX UE may not transmit the RS for RSRP measurement in the current slot (the slot in which the SCI triggering the aperiodic L1-RSRP feedback is located). If the TX UE transmits no RS for RSRP measurement in the slot for triggering the aperiodic RSRP feedback, the RX UE would feed back to the TX UE the L1-RSRP measured on the closest RS prior to the slot in which the trigger signaling is, or the RX UE measures and feeds back to the TX UE the L1-RSRP on the closest RS after the slot in which the trigger signaling is.

Irregular L1-RSRP Feedback

If the sidelink system desires to support the periodic L1-RSRP feedback, the L1-RSRP must be transmitted with periodic sidelink resources. If there are a lot of UEs performing the periodic L1-RSRP feedback, an interference level and a congestion degree are definitely aggravated for the NR V2X Mode 2 based on distributed communication; for the NR V2X Mode 1 based on centralized communication, a sidelink resource scheduling at the base station side is definitely more complicated. A reasonable method may be the irregular L1-RSRP feedback, that is, a feedback timing for the L1-RSRP is nonperiodic. The RX UE feeds back the L1-RSRPs continually after the TX UE triggers the irregular L1-RSRP feedback to the RX UE via an explicit or implicit signaling, and the feedback timing of the L1-RSRP is nonperiodic.

Optionally, the RX UE does not need to feed back each measured L1-RSRP for the purpose of power control based on the sidelink pathloss to the TX UE, but needs to feed back at least one L1-RSRP in a predefined or preconfigured gap. The RX UE decides autonomously which L1-RSRP to be fed back in the gap, but a gap between the measuring slots corresponding to two adjacent L1-RSRPs in time which are fed back should be ensured to not exceed a predefined/preconfigured threshold, in order to ensure a timeliness the L1-RSRP feedback. Optionally, the RX UE feeds back each measured L1-RSRP for the purpose of power control based on the sidelink pathloss to the TX UE, that is, the RX UE may measure and feed back the L1-RSRP as long as it receives the RS for RSRP measurement transmitted by the TX UE.

The TX UE may trigger the irregular L1-RSRP feedback of the RX UE via an explicit signaling. For example, the TX UE triggers (configures) the irregular L1-RSRP feedback to the RX UE via the sidelink RRC signaling, or the TX UE triggers (configures) the irregular L1-RSRP feedback via the MAC CE signaling; the RX UE should perform the irregular L1-RSRP feedback after it receives the trigger (configuration) signaling for the irregular L1-RSRP feedback, until it receives a corresponding sidelink RRC signaling or corresponding MAC CE signaling for terminating the irregular L1-RSRP feedback.

The TX UE may also trigger the irregular L1-RSRP feedback of the RX UE via an implicit signaling. For example, if the power control based on the sidelink pathloss, the RX UE would perform the irregular L1-RSRP feedback after the sidelink RRC connection between the TX UE and the RX UE is established, until the sidelink RRC connection between the TX UE and the RX UE is released.

Optionally, the system may support the periodic/semi-static L1-RSRP feedback, the aperiodic L1-RSRP feedback and/or the irregular L1-RSRP feedback, and triggers them to the RX UE via specific signaling respectively. Optionally, the system only supports one of the periodic/semi-static L1-RSRP feedback or the irregular L1-RSRP feedback, and no specific signaling is required for triggering. If a resource pool in which an unicast PSCCH/PSSCH transmitted to the RX UE by the TX UE is located is configured to apply the power control based on the sidelink pathloss, the RX UE would start to perform the periodic/semi-static L1-RSRP feedback or the irregular L1-RSRP feedback defaultly as long as the sidelink RRC connection between the TX UE and the RX UE is established, until the sidelink RRC connection between the TX UE and the RX UE is released. As a supplement to the periodic/semi-static L1-RSRP feedback or the irregular L1-RSRP feedback, the system may also support the aperiodic L1-RSRP feedback and trigger (indicate) the same via the SCI.

Time Delay of L1-RSRP Feedback

The RX UE should feed back the L1-RSRP to the TX UE as soon as possible after it measures the L1-RSRP. Optionally, the system specifies that the RX UE must feed back the L1-RSRP to the TX UE in a slot after a predefined or preconfigured gap, which predefined or preconfigured gap is for preparing transmission of L1-RSRP. For example, the RX UE should feed back the L1-RSRP in a $4^{th}$ slot after the L1-RSRP measurement. If the RX UE has no time to feed back the L1-RSRP in this slot for some reason, this L1-RSRP should be discarded.

Optionally, the system specifies that the RX UE feeds back the L1-RSRP to the TX UE within a time window of a predefined or preconfigured length after the L1-RSRP measurement, and the time window starts from the first slot after the L1-RSRP measurement, or from the first slot after the predefined or preconfigured gap from the L1-RSRP measurement, which predefined or preconfigured gap is for preparing the transmission of L1-RSRP. For example, the RX UE feeds back the L1-RSRP in the $4^{th}$~$10^{th}$ slots after the L1-RSRP measurement, and which slot being used to feed back the L1-RSRP specifically depends on the RX UE. In other words, the system specifics an earliest timing for the L1-RSRP feedback, that is, the first slot after the predefined or preconfigured gap from the L1-RSRP measurement, for example, the $4^{th}$ slot after the L1-RSRP measurement; the system further specifies a last timing for the L1-RSRP feedback, namely an ending time of the time window, for example, the $10^{th}$ slot after the L1-RSRP measurement. If the RX UE has no time to feed back the L1-RSRP in this slot for some reason, this L1-RSRP should be discarded.

As discussed previously, for each L1-RSRP fed back by the RX UE, the TX UE should be able to determine the slot position at which the corresponding RS for L1-RSRP measurement is located. If the system specifies that the RX UE feeds back the L1-RSRP in the slot after the predefined or preconfigured gap from the L1-RSRP measurement, the RX UE can determine the slot position of the corresponding RS absolutely. If the system specifies that the RX UE feeds back the L1-RSRP to the TX UE within the time window with the predefined or preconfigured length after the L1-RSRP measurement, the TX UE may determine the slot position at which the corresponding RS for L1-RSRP measurement is located according to a predefined rule, for example, the TX UE considers the received L1-RSRP is measured based on the closest RS, which is the predefined or preconfigured gap before the feedback timing. Alternatively, the RX UE indicates the slot position of the RS corresponding to the fed back L1-RSRP via an explicit signaling, for example, the RX UE feeds back the slot position of the corresponding RS when feeding back the L1-RSRP.

Feedback Method of L1-RSRP

In existing NR Uu interface, the L1-RSRP feedback is supported for beam management, while in the NR V2X system the purpose of the SL L1-RSRP feedback is the power control based on the sidelink pathloss. Although purposes of them are different, a same or similar quantization method can be used. For example, the SL L1-RSRP with a range within [−140, −44] dBm is quantized as 7 bits with a quantization gap of 1 dBm. If the RX UE feeds back a plurality of L1-RSRPs corresponding to different measuring slots once to the TX UE, a L1-RSRP, which is measured at the nearest or farthest slot from the timing of the L1-RSRP feedback, may be considered as a reference L1-RSRP, and for the L1-RSRPs measured in the other slots, differential quantized values comparing with the reference L1-RSRP are fed back. The differences between the L1-RSRPs measured in the other slots and the reference L1-RSRP are quantized as 4 bits with a quantization gap of 2 dBm, which saves total information bits and reduces the signaling overhead. For example, it is assumed that the UE feeds back the L1-RSRPs of 4 slots once, and a total feedback bit number is 7+(4−1)*4=19. The quantized values or the differential quantized values of the plurality of L1-RSRPs fed back once may be arranged sequentially in order of corresponding measuring timings. For example, a high-order bit is the L1-RSRP measured in the farthest slot from the feedback timing while a low-order bit is the L1-RSRP measured in the nearest slot from the feedback timing; alternatively, the high-order bit is the L1-RSRP measured in the nearest slot from the feedback timing while the low-order bit is the L1-RSRP measured in the farthest slot from the feedback timing. Optionally, considering that a precision of the L1-RSRP feedback for the purpose of power control based on the sidelink pathloss may be lower than that of the L1-RSRP feedback for the beam management, the SL L1-RSRP herein may adopt a lager quantization gap. For example, the SL L1-RSRP with the range of [−140, −44] dBm is quantized as 6 bits with a quantization gap of 2 dBm.

Optionally, the quantized value of the L1-RSRP is transmitted through PSFCH, that is, the RX UE feeds back the L1-RSRP to the TX UE through the PSFCH. In the current 3GPP Rel-16 NR V2X WID, it is agreed that the HARQ-ACK is transmitted via dedicated PSFCH, and a design for the PSFCH may refer to the PUCCH in the NR Uu system, therefore transmission of the L1-RSRP through the PSFCH is possible. For example, the TX UE triggers the aperiodic L1-RSRP feedback to the RX UE via the SCI, then PSFCH resources for feeding back the L1-RSRP are indicated explicitly in the corresponding SCI, or the corresponding PSFCH resources for feeding back the L1-RSRP are determined implicitly according to the PSCCH/PSSCH resource position at which the SCI is located. Alternatively, the corresponding PSFCH resources are determined by combining the two methods described above.

If the RX UE has both the L1-RSRP feedback and the HARQ-ACK feedback in a same slot, and the L1-RSRP feedback and the HARQ-ACK feedback are for the same UE, the L1-RSRP feedback and the HARQ-ACK feedback may be multiplexed with each other to be transmitted via the PSFCH. If a total bit number of the multiplexed L1-RSRP and HARQ-ACK exceeds a maximum bit number bearable by the PSFCH, the HARQ-ACK is fed back preferentially while the L1-RSRP feedback is discarded. Alternatively, the RX UE always feeds back the HARQ-ACK preferentially and the L1-RSRP feedback is discarded. Optionally, the PSFCH carrying the L1-RSRP and the PSFCH carrying the HARQ-ACK are transmitted with different channel formats, the HARQ-ACK may be multiplexed into the PSFCH format carrying the L1-RSRP when the L1-RSRP feedback conflicts with the HARQ-ACK feedback. Optionally, the PSFCH carrying the L1-RSRP and the PSFCH carrying the HARQ-ACK are transmitted in a same channel format, when the L1-RSRP feedback conflicts with the HARQ-ACK feedback, if the PSFCH resource for the L1-RSRP feedback and the PSFCH resource for the HARQ-ACK feedback are different resources, the L1-RSRP and the HARQ-ACK are multiplexed together to be transmitted with the PSFCH resource corresponding to the L1-RSRP feedback; or, the L1-RSRP and the HARQ-ACK are multiplexed together to be transmitted with the PSFCH resource corresponding to the HARQ-ACK. Herein the HARQ-ACK may be replaced with the CSI, that is, the scheme described above may be applied to combined transmission of the L1-RSRP and the CSI similarly.

If the RX UE has both the L1-RSRP feedback and data transmission in a same slot, and the L1-RSRP feedback and the PSCCH/PSSCH transmission are for the same UE, the L1-RSRP may be transmitted in a piggyback manner of the PSSCH. That is, the L1-RSRP is transmitted with a part of PSSCH resources, modulated and encoded symbols of the L1-RSRP, are mapped to a part of Resource Elements (RE) of the PSSCH resource according to a predefined manner, for example, from the RE of the lowest subcarrier position in the frequency-domain in a first OFDM symbol of the PSSCH resources, in a manner of time-domain first and frequency-domain second.

If the RX UE has both the L1-RSRP feedback and the data transmission in the same slot, the L1-RSRP feedback and the PSCCH/PSSCH transmission are for the same UE, and the PSCCH includes a first PSCCH and a second PSCCH carrying different control information respectively, wherein the first PSCCH is for indicating basic control information, for example, a target receiving UE ID or a target receiving UE group ID, and some basic information for channel monitoring, and the second PSSCH is for indicating detailed schedule information of the PSSCH, for example, a HARQ process number, a coding and modulation manner and new data indication, etc., the L1-RSRP feedback may be carried in the second PSCCH, and the first PSCCH may indicate whether the second PSCCH comprises the L1-RSRP feedback.

Similar to indicating quantized values of the L1-RSRPs of multiple slots by the MAC CE to be described below, the PSFCH may also indicate the quantized values of the L1-RSRPs measured in the multiple slots at a time. Similar to indicating the L1-RSRP measure value and the slot position corresponding to the measurement by the MAC CE to be described below, the PSFCH may also indicate the quantized value of the L1-RSRP and the slot position corresponding to the measurement.

Optionally, the quantized value of the L1-RSRP is transmitted by the MAC CE, that is, the RX UE feeds back the L1-RSRP to the TX UE by the PSSCH. Herein, the RX UE may multiplex the MAC CE indicating the quantized value of the L1-RSRP with other control signaling and/or data to transmit to the TX UE, and may also transmit the PSSCH including only the MAC CE indicating the quantized value of the L1-RSRP. There is no difference between acquiring methods for the PSSCH resource including the L1-RSRP feedback and the PSSCH resource for other control signaling/data transmission. The system needs to define a dedicated MAC CE for indicating the quantized value of the L1-RSRP, for example, the MAC CE comprises one byte (8 bits) wherein the first bit R is a reversed bit and the remaining 7 bits indicate the quantized value of the L1-RSRP. FIG. 2 illustrates a structure of MAC CE for indicating the L1-RSRP.

FIGS. 3A-3C illustrate views of a structure of the MAC CE indicating the quantized values of the L1-RSRPs of multiple slots according to the embodiment of the present disclosure.

In order to further reduce the signaling overhead for feeding back the L1-RSRP, the RX UE may feed back the quantized values of the L1-RSRPs measured on the multiple slots at a time. For example, as illustrated in FIG. 3A, the system defines a new MAC CE of 3 bytes (24 bits) to indicate the quantized values of the L1-RSRPs of 4 slots. The first bit of the MAC CE is a reversed bit, and the subsequent 19 bits indicate the L1-RSRPs, including a 7-bit L1-RSRP reference quantized value, and three 4-bit L1-RSRP differential quantized values, and remaining 4 bits (a character other than R is suggested to be adopted to denote) are reversed bits, as shown in the figure. In order to enable the TX UE to determine the slot positions of the corresponding RS on which the fed back L1-RSRPs are measured, these 4 L1-RSRPs may be specified as 4 nearest L1-RSRPs continuously measured prior to a predefined/preconfigured gap to the feedback timing.

Optionally, the TX UE and the RX UE may differently understand the measuring slot positions corresponding to the L1-RSRP feedback for the purpose of power control based on sidelink pathloss, for example, for some reason, the RX UE misses the RS for RSRP measurement transmitted by the TX UE. That is, the RX UE may not have corresponding L1-RSRP measurement for each RS for RSRP measurement transmitted by the TX UE. In order to avoid the different understanding between the TX UE and the RX UE of the measuring slot positions corresponding to the L1-RSRP feedback, the RX UE indicates the measuring slot position corresponding to the L1-RSRP when feeding back the L1-RSRP. For example, as illustrated in FIG. 3B, the MAC CE indicates one L1-RSRP quantized value and corresponding slot position of the measurement, and as illustrated in FIG. 3C, the MAC CE indicates multiple quantized values of multiple L1-RSRPs and respective corresponding slot positions of the measurements.

The RX UE may indicate a relative position of the slots corresponding to the L1-RSRP measurement by taking the feedback slot of the L1-RSRP as the reference slot. For example, the relative position of the slot corresponding to the L1-RSRP measurement is indicated by indicating an absolute gap or a relative gap prior to the feedback slot of the L1-RSRP, unit of the indication is slot, the absolute gap refers to a number of all slots included in an actual gap, including slots not configured for the V2X transmission, and the relative gap refers to a number of slots configured for the V2X transmission included in the actual gap. Optionally, the relative position of the slot corresponding to the L1-RSRP measurement could be decided by adding a predefined gap for preparing the L1-RSRP transmission to the gap indicated by the MAC CE, that is, the reference slot is the first slot of the predefined gap prior to the feedback slot of the L1-RSRP.

Optionally, when the RX UE feeds back the L1-RSRP to the TX UE by the MAC CE, the L1-RSRP feedback may be triggered by the RX UE according to some rules or events. The system specifies that a time greater than a predefined or preconfigured gap should exist between the two L1-RSRP feedbacks transmitted to the same TX UE by the RX UE, this gap is referred to as a L1-RSRP feedback forbidden gap, the RX UE is not allowed to feed back the L1-RSRP to the same TX UE again within the forbidden gap after feeding back the L1-RSRP once. That is, the RX UE starts a timer with a length of the L1-RSRP feedback forbidden gap after each L1-RSRP feedback, and the RX UE can not trigger the L1-RSRP feedback to the same TX UE if the L1-RSRP feedback forbidden gap timer is still running. The system may also specify that the L1-RSRP feedback is triggered only when a change amount of a newly measured L1-RSRP comparing with the L1-RSRP fed back previously exceeds a predefined or preconfigured threshold. For example, if the L1-RSRP feedback forbidden gap timer expires and the change amount of the new L1-RSRP comparing with the L1-RSRP fed back previously exceeds the threshold, the RX UE should trigger the L1-RSRP feedback. The system may further define a periodic L1-RSRP feedback gap, the RX UE should start a timer with a length of the periodic L1-RSRP feedback gap after feeding back the L1-RSRP for the first time, and the RX UE should trigger the L1-RSRP feedback if the periodic L1-RSRP feedback timer expires, then the RX UE should restart the periodic L1-RSRP feedback timer after feeding back the L1-RSRP if the periodic L1-RSRP feedback timer expires.

Optionally, in order to solve a resource utilization low efficiency problem caused by transmitting PSSCH only including the L1-RSRP MAC CE, the system may define a wait window for the L1-RSRP feedback, the RX UE waits for the PSSCH to be transmitted to the TX UE in the window, and transmits the L1-RSRP by PSSCH piggybacking or by PSSCH including L1-RSRP MAC CE additionally if there is PSSCH to be transmitted to the TX UE in the wait window; and/or, the RX UE waits for the PSSCH to be transmitted to the TX UE in this window, and transmits the L1-RSRP by PSFCH additionally including L1-RSRP indication information, that is, the L1-RSRP and the HARQ-ACK are multiplexed together to be transmitted by the PSFCH, if there is PSFCH for carrying the HARQ-ACK to be transmitted to the TX UE in the window. If the RX UE has no regular PSSCH to be transmitted to the TX UE within the wait window and/or the RX UE has no PSFCH for carrying the HARQ-ACK to be transmitted to the TX UE within the wait window, the RX UE may transmit the L1-RSRP by the PSSCH including only the L1-RSRP MAC CE after the wait window and before a maximum feedback time delay of the L1-RSRP.

Embodiment Two: RX UE feeds back L3-RSRP to TX UE, transmit power of RS for RSRP measurement keeps unchanged, or, TX UE signals information on transmit power of RS for RSRP measurement.

In the Embodiment Two, the RSRP fed back to the TX UE by the RX UE is the L3-RSRP, that is, the RX UE is the performer for performing the higher layer filtering to generate the L3-RSRP. The RX UE measures the RSRP based on the RS transmitted by the TX UE, the physical layer reports the measured L1-RSRP to the higher layer, the L1-RSRP is subject to the higher layer filtering and the L3-RSRP is generated, the RX UE feeds back the generated L3-RSRP to the TX UE, which calculates the sidelink pathloss between the TX UE and the RX UE based on the received L3-RSRP and the transmit power of the RS for RSRP measurement. Particularly, as illustrated in FIG. 4, the Embodiment Two comprises steps as follows.

In step S410, the TX UE triggers the feedback of the L3-RSRP by transmitting a signaling to the RX UE.

In step S420, the RX UE feeds back the L3-RSRP to the TX UE. Herein, the RX UE measures the L1-RSRP based on the RS transmitted by the TX UE after receiving the trigger signaling for the L3-RSRP feedback, the physical layer reports the measured L1-RSRP to the higher layer, the L1-RSRPs in a predetermined period of time are subject to the higher layer filtering to generate the L3-RSRP, and the RX UE feeds back the generated L3-RSRP to the TX UE.

In step S430, the TX UE calculates the sidelink pathloss between the TX UE and the RX UE based on the received L3-RSRP and the transmit power of the RS for RSRP measurement.

In step S440, the TX UE calculates a transmit power based on the sidelink pathloss calculated in step S430, and applies the calculated transmit power to the sidelink transmission transmitted to the RX UE, which sidelink transmission comprising PSCCH, PSSCH, PSFCH, CSI-RS and/or PTRS.

In the Embodiment Two, the performer for generating the L3-RSRP through the RSRP higher layer filtering is the RX UE, the transmit power of the RS for RSRP measurement should remain unchanged; alternatively, the transmit power of the RS for RSRP measurement may be changed, but the TX UE should notify the RX UE of the information on the transmit power of the RS for RSRP measurement. For example, the TX UE signals the RX UE of information on relative change in the transmit power of the RS for RSRP measurement, and the RX UE equivalently compensates the change in the transmit power of the RS to the corresponding measured L1-RSRP after receiving the information, so as to ensure the transmit powers of the all RSs based on which the L1-RSRPs for generating the L3-RSRP are measured are the same equivalently. By compensating the measured L1-RSRPs, the TX UE may adjust the transmit power of the RS for RSRP measurement according to channel condition, which makes L1-RSRP measuring manner more flexible.

Optionally, in step S420, when the RX UE is in coverage (IC) of the cellular network, coefficient alpha of a RSRP higher layer filter used by the RX UE is preconfigured through a UE specific RRC signaling by a serving base station of a cell in which the RX UE locates; when the TX UE is out of coverage (OOC) of cellular network, the coefficient alpha of the RSRP higher layer filter used by the RX UE is preconfigured through sidelink higher layer parameters in a hard-coded manner.

Optionally, in step S420, the coefficient alpha of the RSRP higher layer filter used by the RX UE is preconfigured through the sidelink RRC signaling by the TX UE, and the TX UE acquires this coefficient in a manner of corresponding serving base station preconfiguration or hard-coded preconfiguration. That is, the TX UE acquires the coefficient of the RSRP higher layer filter used by the RX UE in step S420, in the manner of corresponding serving base station preconfiguration or hard-coded sidelink higher layer parameter preconfiguration, and then signals the RX UE of the acquired coefficient alpha of the RSRP higher layer filter via the sidelink RRC signaling.

In the Embodiment Two, the step S410 may be omitted, that is, the TX UE needs not to trigger the L3-RSRP feedback of the RX UE via explicit signaling. For example, if the power control based on the sidelink pathloss is configured to be applied, the RX UE should start the step S410 as soon as the sidelink RRC connection between the TX UE and the RX UE starts to be established, and measures the RSRP continuously based on the RS transmitted by the TX UE and generates and feeds back the L3-RSRP continuously until the sidelink RRC connection between the TX UE and the RX UE is released. By this way, the signaling overhead for triggering the L3-RSRP feedback can be avoided.

TX UE Signals RX UE of Information on Transmit Power of RS for RSRP Measurement

Like the PSSCH, the RS for RSRP measurement may be applied the power control based downlink pathloss and/or the sidelink pathloss, for the purpose of using the transmit power efficiently, reducing the transmit power as much as possible on the basis of meeting the transmission reliability, so as to achieve the purpose of power saving and avoid serious interference to the base station of the serving cell and/or sidelink system. When the transmit power of RS changes dynamically with the change of downlink pathloss and/or sidelink pathloss, the TX UE should inform the RX UE of the information on the transmit power of the RS for RSRP measurement.

Herein, the sidelink pathloss between the TX UE and the RX UE is calculated by the TX UE, therefore the TX UE may only notify the RX UE of the information on the change in the transmit power of the RS for RSRP measurement, without signaling the RX UE of absolute information on the transmit power of the RS for RSRP measurement, in order to ensure the transmit powers of the all RSs based on which the L1-RSRPs for generating the L3-RSRPs are measured are same equivalently at the RX UE side.

Optionally, the TX UE indicates the relative change information on the transmit power of the currently transmitted (that is, transmitted with the SCI) RS for RSRP measurement through the SCI. If the RS for RSRP measurement is the DRMS of PSCCH/PSSCH, the SCI may comprise a field to indicate the relative change information of the transmit power of the currently transmitted DMRS. If the RS for RSRP measurement is the SL CSI-RS, then the SCI contains a field to indicate the relative change information on the transmit power of currently transmitted CSI-RS, which would be further interpreted only when the CSI-RS indicates the transmission of the CSI-RS, that is, the CSI-RS may or may not be in the PSCCH/PSSCH transmission.

In one example, the above-mentioned relative change information on the transmit power of the RS indicated by the SCI is change amount comparing with a reference transmit power. The reference transmit power is determined by the TX UE on its own. The TX UE does not need to notify the RX UE of specific value of the reference transmit power. The RX UE should compensate the change of the transmit power of received RS comparing with the reference transmit power to corresponding L1-RSRP, so as to ensure the transmit powers of the all RSs based on which the L1-RSRPs for generating L3-RSRP are measured are same equivalently, that is, equivalent to using the reference transmit power. After receiving the L3-RSRP, the TX UE should calculate the difference between the L3-RSRP and the reference transmit power as the sidelink pathloss between TX UE and the RX UE. If the reference transmit power of RS determined by the TX UE changes, the TX UE should notify the RX UE to restart the RSRP higher layer filtering through the sidelink RRC signaling. After receiving the signaling to restart the higher layer filtering, the RX UE should restart the RSRP higher layer filtering, that is, the L1-RSRPs measured before and after receiving the signaling should not be used for the same higher layer filtering for L3-RSRP.

In another example, the above-mentioned relative change information on the transmit power of the RS indicated by the SCI is the change amount comparing with the transmit power of the RS transmitted last time. Here, the TX UE determines an initial transmit power of RS on its own, and does not need to inform the RX UE of the specific value of the initial transmit power. The RX UE considers the transmit power of received first RS transmitted by the TX UE as the initial transmit power. The RX UE calculates the change amount of the transmit power of each transmitted RS comparing with the initial transmit power by continuous accumulation, and compensates it to the corresponding measured L1-RSRP, to ensure the transmit powers of the all RSs based on which the L1-RSRPs for generating the L3-RSRP are measured are same equivalently at the RX UE side, that is, equivalent to using the initial transmit power. After receiving the L3-RSRP, the TX UE should calculate the difference between the L3-RSRP and the initial transmit power as the sidelink pathloss between the TX UE and the RX UE. If the initial transmit power of RS determined by the TX UE changes, the TX UE should notify the RX UE to restart the RSRP higher layer filtering through the sidelink RRC signaling. After receiving the signaling to restart the RSRP higher layer filtering, the RX UE should restart the RSRP higher layer filtering, that is, the L1-RSRPs measured before and after receiving the signaling should not be used for the same higher layer filtering for L3-RSRP. In addition, the RX UE should restart the cumulative calculation of the change amount of the transmit power of RS comparing with the initial transmit power, and take the first received RS transmitted by the TX UE, after restarting the RSRP higher layer filtering, as the initial transmit power. If the SCI indicating the relative change information of RS transmit power is lost, there will be an error in the change amount of RS transmit power calculated by the RX UE in accumulation manner comparing with the initial transmit power, and the error will continue to be accumulated. In order to avoid the continuous accumulation and enlargement of errors, the TX UE should reset the initial transmit power of RS within the predefined or preconfigured gap. That is, the system specifies that the TX UE should notify the RX UE to restart the RSRP higher layer filtering within the predefined or preconfigured gap, the RX UE should restart the RSRP higher layer filtering after receiving the signaling to restart the RSRP higher layer filtering, and restart the cumulative calculation of the change of RS transmit power.

In another example, the above-mentioned relative change information on the transmit power of the RS indicated by the SCI may be the change amount comparing with the transmit power of the RS transmitted last time or the change amount comparing with the reference transmit power. The interpreting way for the relative change information indicated by the SCI configured through the sidelink RRC signaling by the TX UE is one of the above two, or the TX UE additionally indicate that the interpreting way of the relative change information is one of the above two, by 1 bit of the SCI field indicating relative change information, that is, the TX UE may dynamically switch between the above two ways.

Optionally, the TX UE indicates the relative change information of the transmit power of RS for RSRP measurement through the MAC CE or the sidelink RRC signaling. The above description of relative change information of the transmit power of RS indicated by the SCI can be applied herein the same way.

For example, the TX UE indicates the change amount in the transmit power of the RS comparing with the reference transmit power through the MAC CE or the sidelink RRC signaling, and the RX UE compensates the received relative change amount in the transmit power of the RS to the corresponding measured L1-RSRP. If the reference transmit power of the RS changes, the TX UE should notify the RX UE to restart the higher layer filtering of RSRP.

Alternatively, the TX UE indicates the change amount in the transmit power of the RS comparing with the transmit power of RS transmitted last time through the MAC CE or the sidelink RRC signaling. The RX UE calculates the change amount in the transmit power of RS transmitted each time comparing with the initial transmit power through continuous accumulation. The initial transmit power corresponds to the first RS for RSRP measurement transmitted by the TX UE and received by the RX UE. The RX UE compensates the calculated relative change amount of the transmit power of the RS to the corresponding measured L1-RSRP. If the initial transmit power of RS changes, the TX UE should inform the RX UE to restart the higher layer filtering of RSRP and the cumulative calculation of the change amount of the transmit power of RS comparing with the initial transmit power, which initial transmit power corresponds to the first RS for RSRP measurement transmitted from the TX UE and received by the RX UE after the RSRP higher layer filtering is reset. In order to avoid the continuous enlargement of the error in the cumulative calculation, the system specifies that the TX UE signals the RX UE to restart the RSRP higher layer filtering and restart the cumulative calculation of the relative change amount of the transmit power of the RS within the predefined or preconfigured time gap.

Unlike indicating the relative change information of the transmitting power of the RS for RSRP measurement through the SCI, the TX UE may indicate the relative change information on the transmission powers of RSs for multiple transmissions at one time through the MAC CE or the sidelink RRC signaling, effect of which is saving the overall signaling overhead. For example, the relative change information of the transmit powers of the RSs including the current transmitted RS and the previous N transmitted RSs is indicated by the MAC CE or the sidelink RRC signaling, wherein N is a predefined or preconfigured value. In order to ensure that the TX UE and the RX UE have totally the same understanding of the slot position of RS with the corresponding power change information, the MAC CE or the sidelink RRC signaling may further indicate the slot position of corresponding RS in addition to the relative change information of the transmit power of RS.

In addition, if the change amount of the transmit power of RS comparing with the reference transmit power is zero, or the change amount of the transmit power of RS comparing with the transmit power of RS transmitted last time is zero, then the TX UE may not transmit the corresponding MAC CE or sidelink RRC signaling indicating the relative change information of the transmit power of RS. Accordingly, if the RX UE does not receive the relative change information of the transmit power of a certain RS, it may consider that the change amount of the transmit power of the RS comparing with the reference transmit power is zero, or the change amount comparing with the transmit power of RS transmitted last time is zero. On the contrary, if the relative change information of the transmit power of RS is indicated by the SCI, in order to ensure that payload size of the SCI is known to the RX UE, no matter whether the transmit power of RS changes or not, the corresponding SCI indication field should be included to keep the payload size of SCI constant. That is, even if the relative change amount of the transmit power of RS is zero, the SCI should also include the corresponding indication field. From this point of view, indicating the relative change information of the transmit power of RS through the MAC CE or the sidelink RRC signaling may save the overall overhead of signaling, as compared with indicating by the SCI. This is because PSSCH and the transmit powers of RS transmitted together therewith would change only when the downlink pathloss and/or the sidelink pathloss calculated by the TX UE changes. The total number that the transmit power of RS changes should be smaller than the total number that the transmit power of RS keeps unchanged. Therefore, it is more economical and effective to indicate the relative change information of the transmit power of RS through the MAC CE or the RRC signaling.

Design for CSI-RS with Unchanged Transmit Power

Optionally, the system requires that the transmit power of the RS for RSRP measurement keeps unchanged, that is, the TX UE doesn't need to notify the RX UE of the information on the transmit power of the RS for RSRP measurement, which has the benefit of saving the signaling overhead. In order to keep the transmit power unchanged, the RS for RSRP measurement uses a preconfigured transmit power, but cannot apply the power control based on the downlink pathloss, or the power control based on the sidelink pathloss.

It is assumed that the CSI-RS is used for the RSRP measurement, in order to avoid resource fragmentation caused by the CSI-RS transmission, the system specifies that the CSI-RS could not be transmitted alone, that is, the CSI-RS must be transmitted with the PSCCH/PSSCH, that is, the CSI-RS is mapped to some REs on certain PSCCH and/or PSSCH symbols. Furthermore, the system also specifies a total transmit power of the each PSCCH/PSSCH symbol in slot should be keep the same, in order to avoid impact on decoding performance of the PSCCH/PSSCH due to abrupt change in the power. Because some OFDM symbols have CSI-RS mapped thereon while others have not, it is difficult to keep the transmit power of the CSI-RS unchanged while ensuring the total transmit power of the each PSCCH/PSSCH symbol in the slot to be same, a new design for mapping pattern for the SL CSI-RS is required.

Optionally, the CSI-RS for RSRP measurement occupies the same number of REs on each OFDM symbol of the PSCCH/PSSCH, the REs for the CSI-RS on the each OFDM symbol may be on the same positions or distributed by interleaving with a certain interval. Because the number of REs for the CSI-RS on each OFDM symbol are the same, when the PSCCH/PSSCH uses the power control based on the downlink pathloss and/or the power control based on the sidelink pathloss, and the CSI-RSs in the same slot use preconfigured transmit power, the total transmit power of each OFDM symbol (namely a sum of the transmit power of the PSCCH/PSSCH and the transmit power of the CSI-RS) may be kept the same, which avoids the impact on the decoding performance of the PSCCH/PSSCH due to the abrupt change in the power.

FIG. 5A illustrates a pattern design for the CSI-RS. In FIG. 5A, the first OFDM symbol in the slot is for Automatic Gain Control (AGC), that is, the UE transmits a signal with the same power as data transmission in the same slot on this symbol, but the specific transmitted signal depends on the implementation of the UE. The last OFDM symbol in the slot is a Guard Period (GP), that is, the UE transmits nothing on this symbol. The $2^{nd}$~$4^{th}$ symbols in the slot are for PSCCH transmission. The $5^{th}$~$13^{th}$ symbols in the slot are for PSSCH transmission. There is one RE for CSI-RS transmission in each PRB of each PSCCH/PSSCH symbol, and frequency-domain position of the CSI-RS RE of each OFDM symbol are the same.

FIG. 5B illustrates another pattern design for the CSI-RS. Similar to the FIG. 5A, there is one RE for the CSI-RS transmission in each PRB of each PSCCH/PSSCH symbol, in FIG. 5B. The difference is that in FIG. 5B, the frequency-domain position of the CSI-RS RE of each OFDM symbol may be different and hop with a certain interval in the frequency-domain.

Optionally, the CSI-RS for RSRP measurement fully occupies the last one or two available OFDM symbols in time in the slot of the PSCCH/PSSCH, and no RE is for the PSCCH/PSSCH transmission in the OFDM symbol(s) occupied by the CSI-RS. The CSI-RS may occupy all REs within allocated bandwidth of the OFDM symbol(s), or may also occupy a part of REs within the allocated bandwidth of the OFDM symbol. Like the SRS transmission in existing systems, such design can keep the transmit power of the CSI-RS unchanged while ensuring the total transmit power for each PSCCH/PSSCH symbol to be the same. When the PSCCH/PSSCH uses the power control based on the downlink pathloss and/or based on the sidelink pathloss, and the CSI-RSs in the same slot use the preconfigured transmit power, abrupt change in the power occurs between the PSCCH/PSSCH transmission and the CSI-RS transmission only and has less impact on detection of the CSI-RS since the receiving of the CSI-RS is based on the detection of sequence.

FIG. 5C illustrates another pattern design for the CSI-RS. In FIG. 5C, the first OFDM symbol in the slot is for an Automatic Gain Control (AGC), that is, the UE transmits a signal with the same power as data transmission in the same slot on this symbol, but the specific transmitted signal depends on the implementation of the UE. The last OFDM symbol in the slot is a Guard Period (GP), that is, the UE transmits nothing on this symbol. The $2^{nd}$~$4^{th}$ symbols in the slot are for PSCCH transmission. The $5^{th}$~$12^{th}$ symbols in the slot are for PSSCH transmission. The 13th symbol in the slot is for the CSI-RS transmission, and all REs within the same transmission bandwidth with the PSSCH in the symbol are occupied by the CSI-RS.

DMRS can be Used for RSRP Measurement Under Certain Conditions (Transmit Power Kept Unchanged)

Generally, DMRS should use the same EPRE with associated physical channel. When the PSCCH/PSSCH is configured to apply the power control based on the downlink pathloss and/or the sidelink pathloss, transmit power of the DMRS of the PSCCH/PSSCH may also change with the change in the downlink pathloss and/or the sidelink pathloss, therefore it is difficult to keep the transmit power of the DMRS unchanged. As described previously, if the transmit power of the RS for RSRP measurement could be kept unchanged, it is not necessary for the TX UE to notify the RX UE of the information on the transmit power of the RS for RSRP measurement, the effect of which is saving the signaling overhead. Because of particularity of the DMRS, only DMRS under certain conditions could be used for RSRP measurement.

Optionally, the data and the DMRS of the PSCCH/PSSCH use different transmit powers respectively, the former (the data of the PSCCH/PSSCH) is applied the power control based on the downlink pathloss and/or the sidelink pathloss, while the latter (the DMRS of the PSCCH/PSSCH) uses the preconfigured transmit power and keeps the transmit power unchanged semi-statically. In order to keep the transmit power of the DMRS unchanged while ensuring the total transmit power of each PSCCH/PSSCH symbol in the slot to be the same, a design similar to the CSI-RS described above can be applied to the DMRS, that is, the DMRS occupies the same number of REs in each PSCCH/PSSCH symbol. Further, because the transmit powers of the DMRS and the data are different, the RX UE has to know a power difference between the DMRS and the data so as to demodulate the data accurately, when a modulation scheme above QPSK is utilized. For example, when the DMRS is configured for the RSRP measurement for the power control based on the sidelink pathloss, the power difference between the DMRS and the data should be indicated in the SCI. Alternatively, in order to avoid the signaling overhead for indicating the power difference between the DMRS and the data, the system specifies that the PSCCH/PSSCH transmission does not use the modulation scheme above the QPSK.

Optionally, the system specifies that the power control based on the sidelink pathloss is applied to only the PSSCH but not the PSCCH. When the TX UE is out of coverage (OOC) of cellular network, that is, when the PSCCH transmitted by the TX UE is not applied the power control based on the downlink pathloss, the DMRS of the PSCCH may be used for RSRP measurement for the power control based on the sidelink pathloss.

Optionally, the system specifies that the power control based on the sidelink pathloss is not applied to broadcast PSCCH/PSSCH. When the TX UE is OOC of the cellular network, that is, the power control based on the downlink pathloss is not applied to the broadcast PSCCH/PSSCH transmitted by the TX UE, if groupcast or unicast PSCCH/PSSCH transmitted by the TX UE is configured to apply the power control based on the sidelink pathloss, the DMRS of the broadcast PSCCH/PSSCH transmitted by the TX UE could be used for the groupcast or unicast RSRP measurement for the purpose of power control based on the sidelink pathloss.

Optionally, when the TX UE is OOC, that is, the groupcast PSCCH/PSSCH transmitted by the TX UE does not use the power control based on the downlink pathloss, if the unicast PSCCH/PSSCH transmitted by the TX UE is configured with the power control based on the sidelink pathloss, the DMRS of the groupcast PSCCH/PSSCH transmitted by the TX UE could be used for the unicast RSRP measurement for the power control based on the sidelink pathloss.

The above DMRS under the certain conditions may be used for the RSRP measurement for the power control based on the sidelink pathloss independently, that is, the system may configure the RX UE to perform the RSRP measurement based on the CSI-RS and/or the DMRS under the certain conditions; or, the above DMRS under the certain conditions could not be used for the RSRP measurement for the power control based on the sidelink pathloss independently, but can only be used to assist the CSI-RS.

Optionally, when the TX UE is OOC, that is, the unicast PSCCH/PSSCH transmitted by the TX UE does not use the power control based on the downlink pathloss, if the unicast PSCCH/PSSCH transmitted by the TX UE is configured with the power control based on the sidelink pathloss, the DMRS of the unicast PSCCH/PSSCH transmitted by the TX UE may assist the CSI-RS in the unicast RSRP measurement for the power control based on the sidelink pathloss, before the RX UE feeds back the L3-RSRP for the first time. The RX UE should measure the L1-RSRP only based on the CSI-RS, once the RX UE feeds back the L3-RSRP and the TX UE adjusts the transmit power of the PSCCH/PSSCH.

Optionally, the system may also support both the above-discussed Embodiment One (L1-RSRP feedback) and the Embodiment Two (L3-RSRP feedback) at the same time, and which method to use is configurable. For example, the system may configure the power control based on the sidelink pathloss on one resource pool to use the L1-RSRP feedback, and configure the power control based on the sidelink pathloss on another resource pool to use the L3-RSRP feedback. The TX UE may also decide which one to use according to Channel Busy Ratio (CBR) on the resource pool. The L3-RSRP feedback is used when the CRB is greater than a predefined/preconfigured threshold, in order to save an entire signaling overhead for the RSRP feedback. The L1-RSRP feedback is used when the CRB is lower than the predefined/preconfigured threshold, in order to obtain more flexibility of the adjustment of the transmit power of the reference signal.

Embodiment Three: RX UE Calculates Sidelink Pathloss between TX UE and RX UE and Feed Back the Same to TX UE In the Embodiment Three, the RX UE calculates the sidelink pathloss between the TX UE and the RX UE, and feeds back the calculated sidelink pathloss to the TX UE. The RX UE measures the RSRP based on the RS transmitted by the TX UE, the physical layer reports the measured L1-RSRP to the higher layer, the L1-RSRP is subject to the higher layer filtering and the L3-RSRP is generated, the RX UE calculates the sidelink pathloss between the TX UE and the RX UE based on the generated L3-RSRP and the transmit power of the RS for RSRP measurement signaled by the TX UE, and feeds back the calculated sidelink pathloss to the TX UE. Particularly, as illustrated in FIG. 6, the Embodiment Three comprises steps as follows.

In step S610, the TX UE sends to the RX UE a signaling for triggering feedback of sidelink pathloss.

In step S620, the RX UE calculates the sidelink pathloss and feeds back the same to the TX UE. In particular, after receiving the signaling for triggering the feedback of the sidelink pathloss, the RX UE measures the L1-RSRP based on the RS transmitted by the TX UE, the physical layer reports the measured L1-RSRP to the higher layer, the L1-RSRPs in the predetermined period of time are subject to the higher layer filtering to generate the L3-RSRP, the RX UE calculates the sidelink pathloss between the TX UE and the RX UE based on the generated L3-RSRP and the transmit power of the RS for RSRP measurement signaled by the TX UE and feeds back the generated sidelink pathloss to the TX UE.

In step S630, the TX UE calculates the transmit power based on the received sidelink pathloss, and applies the calculated transmit power to the sidelink transmission to the RX UE, the sidelink transmission comprising PSCCH, PSSCH, PSFCH, CSI-RS and/or PTRS.

Optionally, in the step S620, when the RX UE is In Coverage (IC) of the cellular network, the coefficient, alpha, of the RSRP higher layer filter used by the RX UE is preconfigured by the serving base station in the cell at which the RX UE is located, through the UE specific RRC signaling; when the RX UE is out of coverage (OOC) of the cellular network, the coefficient, alpha, of the RSRP higher layer filter used by the RX UE is preconfigured by the sidelink higher layer parameter in a hard-coded manner.

Optionally, in step S620, the coefficient, alpha, of the RSRP higher layer filter used by the RX UE is preconfigured through the sidelink RRC signaling by the TX UE, and the TX UE acquires this coefficient in a manner of being preconfigured by the corresponding serving base station or being preconfigured in a hard-coded manner. That is, the TX UE acquires the coefficient of the RSRP higher layer filter used by the RX UE in step S420, in the manner of being preconfigured by the corresponding serving base station or being preconfigured by a hard-coded sidelink higher layer parameter, and then signals the RX UE of the acquired coefficient alpha of the RSRP higher layer filter via the sidelink RRC signaling.

In the Embodiment Three, the step S610 may be omitted, that is, the TX UE needs not to trigger the feedback of the sidelink pathloss to the RX UE via the explicit signaling. For example, if it is configured to apply the power control based on the sidelink pathloss, the RX UE can start the step S620 as soon as the sidelink RRC connection between the TX UE and the RX UE starts to be established, and the RX UE measures the L1-RSRP based on the RS transmitted by the TX UE continuously, generates the L3-RSRP through the higher layer filtering of the RSRP continuously, and calculates and feeds back the sidelink pathloss between the TX UE and the RX UE continuously until the sidelink RRC connection between the TX UE and the RX UE is released. With this manner, the signaling overhead for triggering the sidelink pathloss feedback can be avoided.

TX UE Signals RX UE of Absolute Information on Transmit Power of RS for RSRP Measurement In the Embodiment Three, in order that the RX UE could calculate the sidelink pathloss between the TX UE and the RX UE, the TX UE should notify the RX UE of specific value of the transmit power of the RS for RSRP measurement. For example, the TX UE signals the specific value of the transmit power for the each transmitted RS for RSRP measurement; or, the TX UE signals the RX UE of the specific value of the reference transmit power of the RS for RSRP measurement, and signals the RX UE of a change amount of the transmit power of the RS for RSRP measurement transmitted each time comparing with the reference transmit power; or, the TX UE signals the RX UE the specific value of the initial transmit power of the RS for RSRP measurement, and then signals the RX UE of the change amount of the transmit power of the RS for RSRP measurement transmitted each time comparing with the transmit power of the RS for RSRP measurement transmitted last time.

Herein, regarding the cases where the TX UE signals the RX UE of a change amount of the transmit power of the RS for RSRP measurement transmitted each time comparing with the reference transmit power or signals the RX UE of the change amount of the transmit power of the RS for RSRP measurement transmitted each time comparing with the transmit power of the RS for RSRP measurement transmitted last time, related methods described in the Embodiment Two can be reused. In the Embodiment Two, the RX UE is an entity for performing the RSRP higher layer filtering, the TX UE should notify the RX UE of the relative change information on the transmit power of the RS for RSRP measurement without signaling the specific values of the transmit powers of the RS, and the similar indicating method for the relative change information and the restart signaling of the RSRP higher layer filtering could be reused. Further, the TX UE should notify the RX UE of the reference transmit power or the initial transmit power of the RS for RSRP measurement via the sidelink RRC signaling or the MAC CE.

RS for RSRP Measurement

In the Embodiments One, Two and Three described above, the RS for RSRP measurement may be the SL CSI-RS and/or the DMRS, and the DMRS is the DMRS for PSSCH demodulation and/or the DMRS for the PSCCH demodulation.

Optionally, the system configures the CSI-RS and/or DMRS for the RSRP measurement for the purpose of the power control based on the sidelink pathloss via a dedicated signaling, for example, parameters of the power control based on the sidelink pathloss of the resource pool include configuration information on the RS for RSRP measurement. The system may configure only the CSI-RS for the RSRP measurement for the purpose of power control based on the sidelink pathloss, may also configure only the DMRS for the RSRP measurement for the purpose of power control based on the sidelink pathloss, and may also configure both of the CSI-RS and the DMRS for the RSRP measurement for the purpose of power control based on the sidelink pathloss. If the CSI-RS and the DMRS are transmitted in a same slot, precision of the RSRP measurement can be enhanced. If the CSI-RS and the DMRS are transmitted in different slots, a number of samples of the L1-RSRP can be increased so that the generated L3-RSRP is more accurate.

When both of the CSI-RS and the DMRS are used for the RSRP for the purpose of power control based on the sidelink pathloss, the CSI-RS and the DMRS use the same transmit power. Alternatively, the CSI-RS and the DMRS use different transmit powers. Then a reference RS should be defined, and a power offset of the other RS comparing with the reference RS should be signaled to the RX UE, and the RX UE converts the RSRP measured based on the other RS into an equivalent RSRP value measured based on the reference RS, based on the power offset. For example, the DMRS is defined as the reference RS for RSRP measurement while the CSI-RS is defined as a secondary RS for RSRP measurement, the TX UE should keep a difference between the transmit powers of the CSI-RS and the DMRS constant semi-statically, and notify the RX UE of the power offset of the CSI-RS comparing with the DMRS via the sidelink RRC signaling or the MAC CE signaling.

Optionally, the DMRS is always used for the RSRP measurement for the purpose of power control based on the sidelink pathloss without configuration through dedicated signaling; the CSI-RS may be configured whether to be used for the RSRP measurement for the purpose of the power control based on the sidelink pathloss. For example, the parameters of the power control based on the sidelink pathloss of the resource pool include configuration information on whether the CSI-RS is used for RSRP measurement. That is, for the RX UE, the RSRP measurement based on the DMRS is main, and that based on the CSI-RS is supplementary. If the CSI-RS is configured to assist the RSRP measurement of the DMRS, and the CSI-RS and the DMRS use different transmit powers, the TX UE should notify the RX UE of the power offset of the CSI-RS comparing with the DMRS.

Optionally, the CSI-RS is always used for the RSRP measurement for the purpose of power control based on the sidelink pathloss without configuration through dedicated signaling; the DMRS may be configured whether to be used for the RSRP measurement for the purpose of power control based on the sidelink pathloss through the dedicated signaling. For example, the parameters of the power control based on the sidelink pathloss of the resource pool include configuration information on whether the DMRS is used for RSRP measurement. That is, for the RX UE, the RSRP measurement based on the CSI-RS is main, and that based on the DMRS is supplementary. If the DMRS is configured to assist the RSRP measurement of the CSI-RS, and the CSI-RS and the DMRS use different transmit powers, the TX UE should notify the RX UE of the power offset of the DMRS comparing with the CSI-RS.

Optionally, the UE cannot transmit the CSI-RS alone in one slot, and the CSI-RS has to be transmitted together with the PSCCH/PSSCH. In an example, the CSI-RS may be transmitted together with the broadcast, multicast or unicast PSCCH/PSSCH. In another example, the CSI-RS is transmitted together with only the groupcast or unicast PSCCH/PSSCH. In a further example, the CSI-RS is transmitted with only the unicast PSCCH/PSSCH. When the CSI-RS is transmitted together with the broadcast PSCCH/PSSCH, the CSI-RS is for one of, a plurality of or all of receiving UEs of the broadcast PSCCH/PSSCH, to measure the RSRP and/or CSI; when the CSI-RS is transmitted together with the groupcast PSCCH/PSSCH, the CSI-RS is used for one of, a plurality of or all of UEs of target receiving UE group of the groupcast PSCCH/PSSCH, to measure the RSRP and/or CSI; when the CSI-RS is transmitted together with the unicast PSCCH/PSSCH, the CSI-RS is only used for target receiving UE of the unicast PSCCH/PSSCH, to measure the RSRP and/or CSI. The CSI-RS is mapped to some REs of certain OFDM symbols in one slot according to a predefined or preconfigured pattern. For example, the CSI-RS is mapped to some REs only in the PSSCH resource, or the CSI-RS is mapped to some REs in the PSCCH resource and the PSSCH resource. Transmission bandwidth of the CSI-RS should be the same as that of the PSSCH. The TX UE indicates whether the CSI-RS is transmitted in the current slot by 1 bit of the SCI. when the SCI indicates that the CSI-RS is transmitted in the current slot, a rate matching should be performed for the transmission of the PSCCH and/or PSSCH based on the number of all UEs except the CSI-RS REs, or the PSCCH and/or PSSCH signals originally mapped on the CSI-RS REs are discarded.

In the three embodiment described above, for various reasons, the RX UE may not measure the L1-RSRP and/or feed back the L1-RSRP for a period of time, for example, the TX UE may not transmit the RS for RSRP measurement to the RX UE during this period of time, or the RX UE may fail to receive the RS for RSRP measurement transmitted by the TX UE during this period of time, or the RX UE fails to feed back the L1-RSRP in time during this period of time, then the L1-RSRP measurement and/or L1-RSRP feedback may be interrupted.

Optionally, the interrupt time of the L1-RSRP measurement and/or the L1-RSRP feedback should not exceed a predefined or preconfigured threshold. Particularly, the TX UE should transmit the RS for RSRP measurement at least once during this threshold, that is, a gap between the two RSs for RSRP measurement adjacent in time, transmitted by the TX UE, should not exceed the predefined or preconfigured threshold; and/or, the RX UE should measure the L1-RSRP at least once during this threshold, that is, a gap between the measuring slots corresponding to two L1-RSRPs adjacent in time, measured by the RX UE, should not exceed the predefined or preconfigured threshold; and/or, the RX UE should feed back at least one L1-RSRP during this threshold, that is, a gap between the measuring slots corresponding to two L1-RSRPs adjacent in time, fed back by the RX UE, should not exceed the predefined or preconfigured threshold.

Optionally, there is no limitation on the interrupt time of the L1-RSRP measurement and/or the L1-RSRP feedback. If the interrupt time of the L1-RSRP measurement and/or the L1-RSRP feedback exceeds the predefined or preconfigured threshold, the entity performing the higher layer filtering should restart the RSRP higher layer filtering.

Embodiment Four: TX UE Transmits Signaling for Triggering SL CSI Feedback to RX UE, RX UE Feeds Back Measured SL CSI to TX UE In the Embodiment Four, in order for the TX UE to adjust a Modulation Coding Scheme (MCS) of the sidelink transmission better, the RX UE feeds back a measured Sidelink Channel-State Information (SL CSI) between the TX UE and the RX UE to the TX UE, so as to achieve an effect of link adaptation. Particularly, as illustrated in FIG. 7, the Embodiment Four comprises steps as follows.

In step S710, the TX UE transmits a signaling for triggering a SL CSI feedback to the RX UE. For example, the TX UE transmits the signaling for triggering the SL CSI feedback to the RX UE via the SCI.

In step S720, the RX UE measures the SL CSI based on the SL CSI-RS transmitted by the TX UE.

In step S730, the RX UE feeds back the measured SL SCI to the TX UE.

Optionally, the TX UE triggers the SL CSI feedback to the RX UE via the SCI, that is, the SCI includes 1 bit for indicating whether the SL CSI feedback is triggered, or the SCI includes a plurality of bits for indicating whether to trigger the SL CSI feedback and triggering a certain one of multiple SL CSI feedback modes preconfigured by the higher layer. Herein the TX UE configures a plurality of SL CSI feedback modes to the RX UE via the SL RRC signaling, for example, a subband CSI feedback or a wideband CSI feedback, etc. Further, the TX UE may also indicate the transmission of the CSI-RS to the RX UE via the SCI, that is, the SCI includes 1 bit for indicating whether the CSI-RS is transmitted in the slot of the SCI, or the SCI includes a plurality of bits for indicating whether the CSI-RS is transmitted and transmitting a certain one of a plurality of CSI-RSs preconfigured by the higher layer. Herein the TX UE configures the plurality of CSI-RSs to the RX UE via the SL RRC signaling, for example, antenna port configuration and/or pattern configuration of the plurality of CSI-RSs.

In an example, the SCI field for indicating whether the SL CSI-RS is transmitted and the SCI field for indicating whether the SL CSI feedback is triggered are two independent indication fields. For example, the SL CSI feedback may be not triggered in the slot where transmission of SL CSI-RS is indicated, the CSI-RS may be not transmitted in the slot where it is indicated that the SL CSI feedback is triggered, and the TX UE may transmit one or more CSI-RS slots for the SL CSI measurement by the RX UE after the SL CSI feedback is triggered.

In another example, the SCI field for indicating whether the SL CSI-RS is transmitted and the SCI field for indicating whether the SL CSI feedback is triggered are two different indication fields, and the two indication fields have some association. For example, the SL CSI-RS should be transmitted when the SCI indicates the triggering of the SL CSI feedback, that is, the SCI should also indicate the transmission of the SL CSI-RS, and the transmitted SL CSI-RS is for the SL CSI measurement; the SL CSI feedback is not necessary to be triggered when the SCI indicates the transmission of the SL CSI-RS, that is, the SCI may not trigger the SL CSI feedback, and the transmitted SL CSI-RS is for measurement for other purpose, for example, the L1-RSRP measurement.

In a further example, the SCI field for indicating whether the SL CSI-RS is transmitted and the SCI field for indicating whether the SL CSI feedback is triggered are the same field. For example, the SL CSI-RS would be implicitly indicated to be transmitted in this slot if the SCI indicates that the SL CSI feedback is triggered, and the SL CSI-RS would be implicitly indicated not to be transmitted in this slot if the SCI indicates that the SL CSI feedback is not triggered; or, the SL CSI feedback would be implicitly indicated to be triggered if the SCI indicates the transmission of the SL CSI-RS in the slot, and the SL CSI feedback would be implicitly indicated not to be triggered if the SCI indicates the SL CSI-RS is not transmitted in the slot.

Optionally, the RX UE feeds back the SL CSI to the TX UE within a time window of a predefined or preconfigured length, after receiving the signaling for triggering the SL CSI feedback transmitted by the TX UE. That is, a gap between the signaling for triggering the SL CSI feedback transmitted by the TX UE and the corresponding SL CSI fed back by the RX UE is variable, rather than fixed. Within the time window for the SL CSI feedback, the slot for feeding back the SL CSI is decided by the RX UE autonomously. If the RX UE fails to feed back the SL CSI within the time window for the SL CSI feedback, this SL CSI should be discarded. Introducing the time window for the SL CSI feedback aims to ensure a timeliness of the SL CSI feedback, expired SL CSI feedback is not only not good for the system, but also has disadvantage.

In an example, the time window for the SL CSI feedback is defined as starting from a time at which the signaling for triggering the SL CSI feedback transmitted by the TX UE is received by the RX UE. In another example, the time window for the SL CSI feedback is defined as starting from a fixed time after the signaling for triggering the SL CSI feedback transmitted by the TX UE is received by the RX UE. As illustrated in FIG. 8, the time window for the SL CSI feedback starts from a minimum preparation time for SL CSI feedback after the slot triggering the SL CSI feedback, the minimum preparation time comprises processing time for transmitting the SL CSI and the like. For example, it is assumed that the minimum preparation time for SL CSI feedback is N−1 slots, the time window for the SL CSI feedback would start from the Nth slot after the slot triggering the SL CSI feedback, wherein N is a predefined value. If the SL CSI is fed back in a piggyback manner of PSSCH or through the PSFCH in the physical layer, a minimum preparation time as the CSI feedback of the Uu system may be used, namely N=4, and if the SL CSI is fed back via the MAC CE, the minimum preparation time for SL CSI feedback may be greater than that for the CSI feedback of the Uu system, for example, N=5.

In an example, the time window for SL CSI feedback is defined as starting from a time at which the RX UE receives the CSI-RS transmitted by the TX UE. In another example, the time window for SL CSI feedback is defined as starting from a fixed time after the RX UE receiving the CSI-RS transmitted by the TX UE. For example, similar to FIG. 8, the time window for SL CSI feedback starts from the minimum preparation time for SL CSI feedback after receiving the CSI-RS. Their difference is in that a reference point of the time window for SL CSI feedback is the slot of transmitting the CSI-RS, namely the slot of performing the CSI measurement, instead of the slot of triggering the SL CSI feedback. The slot of performing the CSI measurement may be or after the slot where the SL CSI feedback is triggered.

Unit of length of the time window for SL CSI feedback is slot. A measurement of the time window may be absolute slots, that is, the length of the time window is the number of all slots included therein; or, the measurement of the time window may be relative slots, that is, the length of the time window is a number of slots configured to be available for the sidelink transmission included therein, excluded slots not configured to be available for the sidelink transmission.

All methods for triggering the L1-RSRP feedback described in the Embodiment One may be applied to triggering the SL CSI feedback similarly. For example, a periodic SL CSI feedback is triggered via the RRC signaling, and/or a semi-persistent SL CSI feedback with one of a plurality of preconfigured period values is triggered via the MAC CE. That is, the timing for feeding back the SL CSI by the RX UE has periodicity, and the periodicity may be discontinuous without being completely continuous. Alternatively, Aperiodic SL CSI feedback is triggered via SCI, that is, RX UE feeds back SL CSI one time to correspond to one triggering signaling transmitted by the TX UE. Alternatively, aperiodic SL CSI feedback is triggered via SCI, MAC CE or RRC signaling, that is, RX UE feeds back SL CSI multiple times to correspond to one triggering signaling transmitted by the TX UE.

All methods for feeding back the quantized value of SL L1-RSRP via the MAC CE described in the Embodiment One may be applied to the SL CSI feedback similarly, that is, the RX UE feeds back the measured SL CSI to the TX UE via the MAC CE, and the SL CSI comprises SL Channel Quality Indicator (CQI), SL Rank Information (RI) and/or SL Precoding Matrix Indicator (PMI). The MAC CE indicating the SL CSI may be multiplexed with data packets, the SL RRC signaling or other MAC CEs, which are transmitted to the same UE, into the same PSSCH and transmitted, or may be included in the PSSCH alone and transmitted.

When the TX UE triggers the SL CSI feedback to the RX UE via the SCI, the TX UE transmits the SL CSI-RS at or after the slot of triggering the SL CSI feedback, the RX UE measures the CSI based on the SL CSI-RS transmitted by the TX UE and reports the measured CSI to MAC layer. If there is PSSCH resource, which is allocated by the serving base station or the UE autonomously, having been allocated for other transmission within the time window for SL CSI feedback, the MAC CE indicating the SL CSI may be multiplexed into the same PSSCH with other transmission and transmitted on the allocated PSSCH resource; if there is no allocated PSSCH resource within the time window of SL CSI feedback, sidelink resource should be allocated within the time window for SL CSI feedback for the transmission of the MAC CE indicating the SL CSI. Before the preparation of the transmission of the PSSCH including the MAC CE indicating the SL CSI, if the RX UE receives a new CSI-RS transmitted by the TX UE, the RX UE should measure the CSI based on the latest CSI-RS transmitted by the TX UE and replace the previous SL CSI with the latest measured SL CSI.

Optionally, besides the indication information on the SL CSI, one MAC CE may further comprise an indication information on a measuring slot position corresponding to the SL CSI, so that the TX UE can determine on which slot of CSI-RS the CSI fed back by the RX UE is measured.

In an example, the MAC CE for the SL CSI feedback further indicates a gap between the feedback slot of the SL CSI and the corresponding measuring slot, as illustrated in FIG. 9A. A metric unit of the gap is slot, that is, the MAC CE indicating the SL CSI also indicates the number of slots between the feedback slot and the corresponding measuring slot of the SL CSI. Similarly, the metric of the gap may be absolute slots, namely the number of all slots between the feedback slot and the corresponding measuring slot of the SL CSI; or the metric of the gap may be relative slots, namely the number of the slots configured available for the sidelink transmission between the feedback slot and the corresponding measuring slot of the SL CSI, excluding the slots not configured available for the sidelink transmission.

In another example, the MAC CE for the SL CSI feedback further indicates a gap between a feedback preparation slot and the corresponding measuring slot of the SL CSI, as illustrated in FIG. 9B. Herein the feedback preparation slot of the SL CSI refers to a time at which the RX UE starts preparing to transmit the SL CSI, for example, the RX UE starts to process operations such as a channel encoding of the SL CSI, etc. A gap between the feedback slot and the corresponding preparation slot of the SL CSI is a predefined value, for example, the RX UE starts to prepare the transmitting process of the SL CSI at the $4^{th}$ slot before the feedback slot. Similarly, the gap, indicated by the MAC CE, between the feedback preparation slot and the corresponding measuring slot of the SL CSI may comprises all slots, or only all slots configured available for the sidelink transmission.

In a still example, the TX UE sequentially numbers its transmitted CSI-RSs for CSI measurement in time, and indicates the number of the CSI-RS to the RX UE as transmitting the CSI-RS by explicit signaling or implicit signaling, the MAC CE for the SL CSI feedback further indicates the number of the CSI-RS measured corresponding to the SL CSI. Herein the numbers of the CSI-RSs are limited in time, and when the number of slots of the CSI-RSs transmitted by the TX UE actually exceeds a maximum number, the number of the CSI-RSs should restart from 0.

The TX UE may indicate the number of the CSI-RS by a dedicated field included in the SCI within the slot at which the CSI-RS is located when transmitting the CSI-RS; alternatively, the number of the CSI-RS is indicated by the MAC CE included in the PSSCH within the slot at which the CSI-RS is located; alternatively, the number of the CSI-RS is implicitly indicated by the SCI field for triggering the CSI-RS feedback, for example, the SCI field for triggering the CSI-RS feedback may further indicate the pattern of the transmitted CSI-RS, and the patterns of the multiple CSI-RSs for the same SL CSI feedback triggering event transmitted to the same RX UE by the TX UE should be different, then pattern of the CSI-RS transmitted by the TX UE may denote the number of the CSI-RS implicitly.

Priority of SL RRC Signaling and/or SL MAC CE Transmission

In the LTE V2X system, the SCI comprises a field for indicating priority of a data package transmitted by the associated PSSCH, the priority is transmitted to the physical layer from application layer of the V2X, which decides the corresponding priority according to a service type of the data package and/or QoS and the like. In the NR V2X system, besides the data package, the PSSCH transmitted to the RX UE by the TX UE may further comprise the SL RRC signaling and the SL MAC CE, wherein the SL RRC signaling and the SL MAC CE are mainly for the unicast transmission, for example, the SL RRC signaling is for establishment of an unicast RRC connection state between the TX UE and the RX UE, including a higher layer parameter configuration and signaling control, etc., and the SL MAC CE is used for the RX UE to feed back the SL CSI, feed back the SL L1-RSRP to the TX UE or report Power Headroom Report (PHR), and the like. If the PSSCH comprises only the SL RRC signaling and/or the SL MAC CE without the data package, setting of the priority indicating value included in the corresponding SCI should be specified.

Optionally, the SL RRC signaling and/or the MAC CE signaling are transmitted with a predefined or preconfigured priority. For example, the PSSCH transmission only including the SL RRC signaling and/or SL MAC CE has the highest priority, namely has the priority with the minimum indication value, in default, or has the lowest priority, namely has the priority with the maximum indication value, in default, or has a middle priority, namely has the priority with a medium indication value, in default. Alternatively, the PSSCH transmission only including the SL RRC signaling and/or SL MAC CE has a preconfigured priority, if the UE is IC, the priority is preconfigured by the serving base station via the RRC signaling, and if the UE is OOC, the priority is preconfigured by the higher layer sidelink parameter in a hard-coded manner.

When the SL RRC signaling and/or the SL MAC CE are multiplexed into the same PSSCH with the data package and transmitted, there are several methods to determine the priority of the PSSCH transmission. For example, in an example, the priority corresponding to the PSSCH transmission including the data package together with the SL RRC signaling and/or SL MAC CE uses a higher one between the priority of the data package and the priority of the SL RRC signaling and/or the SL MAC CE. In another example, the priority corresponding to the PSSCH transmission including the data package together with the SL RRC signaling and/or SL MAC CE uses the priority of the data package in default. In a further example, the priority corresponding to the PSSCH transmission including the data package together with the SL RRC signaling and/or SL MAC CE uses the priority of the SL RRC signaling and/or the SL MAC CE in default.

Optionally, the PSSCH transmission including only the SL RRC signaling and the PSSCH transmission including only the SL MAC CE are transmitted with the same priority, that is, the SL RRC signaling and the SL MAC CE use the same predefined or preconfigured priority; or, the PSSCH transmission including only the SL RRC signaling and the PSSCH transmission including only the SL MAC CE are transmitted with different priorities, that is, the SL RRC signaling and the SL MAC CE use different predefined or preconfigured priorities.

Optionally, all of the SL MAC CEs use the same priority, for example, the PSSCH transmission including only the MAC CE indicating the SL CSI and the PSSCH transmission including only the MAC CE indicating the SL L1-RSRP are transmitted with the same priority, that is, all SL MAC CEs use the same predefined or preconfigured priority. Alternatively, different SL MAC CEs use different priorities, for example, the PSSCH transmission including only the MAC CE indicating the SL CSI and the PSSCH transmission including only the MAC CE indicating the SL L1-RSRP are transmitted with different priorities, that is, the SL MAC CEs for different purposes use the different predefined or preconfigured priorities respectively.

Embodiment Five: Process for Input Sample Missing in Aperiodic SL-RSRP Measurement of Layer 3 Filter The Layer 3 filter of SL RSRP for the purpose of power control described above may reuse the Layer 3 filter for RRM measurement in existing Uu system. The existing Layer 3 filter is for periodic measurement mainly, but the RS for RSRP measurement transmitted to the RX UE by the TX UE is aperiodic in the V2X system. Therefore some adaptive processing are required as applying the existing Layer 3 filter to the aperiodic RSRP measurement.

The following equation is the Layer 3 filter in the existing Uu system:

$$F_n = (1-a)*F_{n-1} + a*M_n$$

wherein Mn is a latest measurement result received from the physical layer; $F_n$ is a latest Layer 3 filtered measurement result; $F_{n-1}$ is previous Layer 3 filtered measurement result; $a=\frac{1}{2}^{(k/4)}$, herein K is referred to as a filter coefficient, with a range including 0, 1, 2, 3, 4, 5, 6, 7, 8, 9, 11, 13, 15, 17, 19, and when k=O, the Layer 3 filter is not performed, that is, the measurement result after the Layer 1 filtering is reported and specific operations of the Layer 1 filter depend on an implementation of the UE.

The Layer 3 filter described above requires an input frequency of the sample to be one sample per X milliseconds, that is, the physical layer reports the latest measurement result to the higher layer per X milliseconds, X is a predefined value. In the NR Uu system, X is an intra-frequency measurement period defined in 3GPP 38.133 and is related to frequency range of carriers.

In the NR V2X system, the RS for RSRP measurement transmitted by the TX UE is aperiodic, a gap between the two adjacent RSs for RSRP measurement transmitted by the TX UE may exceed the X milliseconds described above, then the RX UE may not ensure to measure the RSRP at least once per X milliseconds. Sample missing may occur to the Layer 3 filter with the input frequency of one sample per X milliseconds. The standard should clarify and specify for this case.

If the gap between two adjacent RSs for RSRP measurement received by the RX UE exceeds the sample period (namely the X milliseconds described above) for the Layer 3 filter, the physical layer may has no latest measurement result to report at a certain time point at which a sample should have been reported to the higher layer from the physical layer of the RX UE. In view of this, optionally, the physical layer reports the measurement result reported last time to the higher layer again for Layer 3 filtering. Optionally, the physical layer skips the report this time, namely, the corresponding input sample is missed, and the higher layer estimates the missed middle sample based on the measurement result reported previously and the latest measurement result reported by the physical layer when the physical layer has the latest measurement result to report. For example, an average of the measurement result reported before and after the missed sample is taken as the estimated value of the missed sample, the higher layer updates an output of the Layer 3 filter based on the latest reported measurement result and the estimated value of the missed middle sample. Optionally, the physical layer skips the report this time and the higher layer updates the output of the Layer 3 filter by assuming that the sample value reported this time is 0.

In an optional scheme, in order to avoid the case of input sample missing because the gap between the two adjacent RSs of RSRP measurement transmitted by the TX UE exceeds the sample period (namely the X milliseconds described above) for the Layer 3 filtering, the system specifies the TX UE to transmit the RS for RSRP measurement at least once per X milliseconds. Assuming that the RS for RSRP measurement is PSSCH DMRS or the RS for RSRP measurement is the CSI-RS not transmitted independently (must be transmitted together with the PSSCH), in a word, the RS for RSRP measurement could be transmitted only when the TX UE transmits the PSSCH to the RX UE, in order to ensure the TX UE to transmit the RS for RSRP measurement at least once per X milliseconds, if the TX UE has no transmission data to be transmitted to the RX UE for the X milliseconds, the TX UE should transmit the PSSCH including 0 MAC SDU to the RX UE, so as to achieve the purpose of transmitting the RS for RSRP measurement at least once.

Embodiment Six: under a condition that the TX UE knows a configuration of the Layer 3 filter for the RSRP at the RX UE side, the TX UE may change the transmit power of the RS for RSRP measurement within a Layer 3 filtering window at the RX UE side without signaling the RX UE of change information on the transmit power of the RS.

In the Embodiment Two described previously, the RX UE performs the Layer 3 filtering for the SL RSRP and feeds back the filtered L3-RSRP to the TX UE. In the L3-RSRP filtering window at the RX UE side, the TX UE should keep the transmit power of the RS for RSRP measurement unchanged, so that all of the input samples for the L3-RSRP filtering are measured based on the RSs with the same transmit power to ensure the accuracy of the L3-RSRP. Alternatively, TX UE may change the transmit power of the RS for RSRP measurement but needs to notify the RX UE of the change information on the transmit power of the RS for RSRP measurement, so that the RX UE could correct the samples reported to the higher layer based on the corresponding change amount, and all of the input samples for generating the L3-RSRP filtering are equivalent to be measured based on RSs with the same transmit power, which can ensure the accuracy of the L3-RSRP.

The Embodiment Two described above assumes that the TX UE does not know the filter configuration for generating the L3-RSRP at the RX UE side. If the TX UE knows the filter configuration for generating the L3-RSRP at the RX UE side, the TX UE would know corresponding coefficient of the each input sample for the Layer 3 filtering at the RX UE side, therefore an adjustment for the L3-RSRP based on the change in the transmit power of the RS may be performed by the TX UE. When the TX UE changes the transmit power of the RS for RSRP measurement in the filter window of the L3-RSRP, the TX UE needs not to notify the RX UE of the change information on the transmit power of the RS, because the TX UE knows both the change amount and the change time of the transmit power of the RS, the TX UE may adjust the received L3-RSRP based on a product of the change amount of the transmit power and the coefficient of the corresponding sample, so as to ensure the accuracy of the L3-RSRP for calculating the sidelink pathloss.

In the Embodiment Six, the TX UE may change the transmit power of the RS for RSRP measurement in the filtering window of the L3-RSRP at the RX UE side, and the TX UE does not need to notify the RX UE of the change information on the transmit power of the RS for RSRP measurement. If the TX UE changes the transmit power of the RS for RSRP measurement within the filter window of the L3-RSRP, the TX UE should adjust the received L3-RSRP fed back by the RX UE based on corresponding change amount.

Following equations may be deduced from the equation of the Layer 3 filter described above:

$$F_1 = M_1$$

$$F_2 = (1-a)*M_1 + a*M_2$$

$$F_3 = (1-a)^2*M_1 + (1-a)*a*M_2 + a*M_3$$

$$\ldots$$

$$F_n = (1-a)^{n-1}*M_1 + (1-a)^{n-2}*a*M_2 + \ldots + (1-a)^{n-j}*a*M_{n-j} + \ldots + (1-a)*a*M_{n-1} + a*M_n$$

Based on the above equations, it can be seen that the corresponding coefficient for the jth input sample of the filter is $(1-a)^{n-j}*a$, if the TX UE adjusts the transmit power of the RS for this sample measurement by $\Delta$dB the adjustment amount for the received L3-RSRP by the TX UE is $(1-a)^{n-j}*a*\Delta$, for example, if the TX UE increases the transmit power of the RS for the jth sample measurement by $\Delta$dB, the TX UE should subtract $(1-a)^{n-j}*a*\Delta$ from the received L3-RSRP.

The Embodiment Six assumes that the TX UE knows the filter configuration for generating the L3-RSRP at the RX UE side, including the Layer 3 filter coefficient K and the input period (namely the X milliseconds described above) of the samples for filtering. Further, the TX UE and the RX UE should understand consistently about on the RS(s) of which slot(s) a certain input sample of the Layer 3 filter is measured based.

Optionally, in order to ensure the consistent understanding between the TX UE and the RX UE about the RS in which slot(s) is/are used for the measurement of the jth input sample, the system specifies that, taking the slot including the first RS for RSRP measurement received by the RX UE as a start time point, only the physical layer measurement results measured on the RSs received in a time window from (j−1)*K to j*K milliseconds may be used to generate the jth input sample to be reported to the higher layer. That is, the jth input sample reported to the higher layer by the physical layer is the RSRP measurement results after Layer 1 filtering within the time window from (j−1)*K to j*K milliseconds. Specific operations of the Layer 1 filtering depend on the implementation of the UE.

In the existing Uu system, the Layer 3 filter parameters are configured by the base station and are UE specific, that is, the base station may configure different Layer 3 filter parameters for different UEs. In the NR V2X system, however, in order for the consistent understanding between the TX UE and the RX UE of the Layer 3 filter configuration for RSRP at the RX UE side, the configuration manner of the Layer 3 filter parameters may be different from the existing Uu system.

Optionally, the Layer 3 filter parameters of the RSRP for the purpose of power control at the RX UE side is configured by the TX UE, for example, the TX UE configures the Layer 3 filter parameters for the RX UE via PC5 RRC signaling. That is, the TX UE and the RX UE understand the Layer 3 filter configuration consistently.

Optionally, the Layer 3 filter parameters of the RSRP for the power control at the RX UE side is configured by sidelink system information, for example, the Layer 3 filter parameters are configured in sidelink PBCH. That is, all UEs in the same area have consistent understanding on the Layer 3 filter configuration.

Optionally, the Layer 3 filter parameters of the RSRP for the power control at the RX UE side is resource pool specific configuration, for example, the Layer 3 filter parameters are included in resource pool configuration information set, and the configured Layer 3 filter parameters are only used for the RSRP measurement on corresponding resource pool. That is, all UEs have the same understanding on the Layer 3 filter configuration for the RSRP measurement on the same resource pool, and different Layer 3 filter configurations may be used for the RSRP measurements on different resource pools.

In the NR V2X system, the RS for RSRP measurement transmitted to the RX UE by the TX UE is aperiodic, and the TX UE can transmit the RS for RSRP measurement only when it transmits PSSCH to the RX UE, then a transmit frequency of the RS for RSRP measurement by the TX UE may be associated with service characteristic, which makes the input period (namely the X milliseconds described above) of the RSRP sample for the Layer 3 filtering at the RX UE may also be associated with the service characteristic of the TX UE.

Optionally, besides the Layer 3 filter coefficients, the Layer 3 filter configuration at the RX UE side further comprises configuration of the input period (X value) of the sample, that is, the value of X is configurable, instead of fixed.

Optionally, the value of the Layer 3 filter coefficient k at the RX UE side is configured by the sidelink system information, and the value of the input period X of the RSRP sample for the Layer 3 filtering is configured by the TX UE via the PC5 RRC signaling. The TX UE configures the value of X according to the characteristic of the service transmitted to the RX UE. That is, different RX UEs use the same Layer 3 filter coefficient k, but may use different sample input period X milliseconds, and the value of X is associated with the data service characteristic transmitted to the RX UE by the TX UE.

In an optional scheme, the TX UE may change the transmit power of the RS for RSRP measurement in the Layer 3 filtering window at the RX UE side without signaling the RX UE of the change information on the transmit power of the RS, and does not adjust the received L3-RSRP based on the change amount of the transmit power of the RS. When the TX UE changes the transmit power of the RS, the TX UE should transmit a signaling for triggering a Layer 3 filter reset at the RX UE side, in order to ensure the accuracy of the L3-RSRP. For example, the TX UE triggers the Layer 3 filter reset at the RX UE side via MAC CE, after receiving the trigger signaling, the RX UE should perform the reset of the Layer 3 filter, that is, setting the output of the filter as $F_o$ and samples are input again to start the Layer 3 filtering.

Particularly, assuming that the RX UE receives the PSSCH carrying the MAC CE triggering the Layer 3 filter reset in the slot n, then the RX UE performs the reset of the filter in the slot $n+3 \cdot N_{slot}^{subframe,\mu}+1$, herein N slot is the number of slots included in one subframe in the case of the subcarrier spacing used by the current PSSCH; or the RX UE performs the reset of the filter in the slot $n+k_1+3 \cdot N_{slot}^{subframe,\mu}+1$, herein $k_1$ is the time for HARQ-ACK feedback of the PSSCH carrying the MAC CE triggering the Layer 3 filter reset, that is, a gap between the PSFCH carrying the HARQ-ACK and the corresponding PSSCH.

Similarly, time points are applied to the other MAC CE instructions described previously, for example, the TX UE triggers the RX UE to report the SL RSRP via the MAC CE, assuming that the RX UE receives the PSSCH carrying the MAC CE triggering the SL RSRP report in the slot n, then the RX UE reports the SL RSRP to the TX UE in or after the slot $n+3 \cdot N_{slot}^{subframe,\mu}+1$; or the RX UE reports the SL RSRP to the TX UE in or after the slot $n+k_1+3 \cdot N_{slot}^{subframe,\mu}+1$.

Embodiment Seven: TX UE receives L3-RSRP reported by RX UE. The L3-RSRP is obtained by the RX UE performing Layer 3 filtering of RSRP, which is measured based on PSSCH DMRS transmitted by the TX UE. The TX UE determines reference PSSCH DMRS transmit power. The TX UE estimates the sidelink pathloss between the TX UE and the RX UE according to difference between the determined reference PSSCH DMRS transmit power and the received L3-RSRP, and then calculates the transmit power of PSCCH/PSSCH transmitted to the RX UE based on the estimated sidelink pathloss between the TX UE and the RX UE.

Please note, the PSSCH DMRS transmit power mentioned in Embodiment Seven and below refers to transmit power on each resource element of PSSCH DMRS, that is, Energy Per Resource Element (EPER), rather than total transmit power of the PSSCH DMRS.

The TX UE calculates PSSCH transmit power based on the sidelink pathloss according to an equation as follows.

$$P_{PSSCH,SL}=P_{0,SL}+10 \log_{10}(2^{u} \cdot M_{RB}^{PSSCH})+a_{SL} \cdot PL_{SL}$$

Herein, $P_{O,SL}$ is p0-SL-PSCCHPSSCH, one of power control parameters based on sidelink pathloss, configured via higher layer, $a_{SL}$ is alpha-SL-PSCCHPSSCH, one of power control parameters based on sidelink pathloss configured via higher layer, $M_{RB}^{PSSCH}$, is the number of RBs occupied by PSSCH, u is subcarrier spacing configuration used by sidelink transmission, and $PL_{SL}$ is the sidelink pathloss between the TX UE and the RX UE.

The TX UE estimates the sidelink pathloss between the TX UE and the RX UE according to an equation as follows.

$$PL_{SL}=\text{refernceSignalPower-higherLayerFilteredRSRP}$$

Herein, referenceSignalPower is the reference PSSCH DMRS transmit power determined by the TX UE, higherLayerFilteredRSRP is the L3-RSRP reported by the RX UE and received by the TX UE, the L3-RSRP is obtained by the RX UE performing Layer 3 filtering of RSRP, which is measured based on PSSCH DMRS transmitted by the TX UE, parameters for the Layer 3 filter are provided by the configuration parameter filterCoefficient-SL.

In Embodiment Seven, transmit power of the PSSCH DMRS transmitted to the RX UE from the TX UE may change. For example, the transmit power of the PSSCH DMRS transmitted to the RX UE from the TX UE changes as the sidelink pathloss between the TX UE and the RX UE estimated by the TX UE changes. For example, if the TX UE is configured with sidelink power control based on downlink pathloss, the transmit power of the PSSCH DMRS transmitted to the RX UE from the TX UE may change as the downlink pathloss estimated by the TX UE (namely the pathloss between the TX UE and the base station) changes.

The TX UE may take actual transmit power of the PSSCH DMRS transmitted to the RX UE as the reference PSSCH DMRS transmit power for the sidelink pathloss estimation, if the transmit power of the PSSCH DMRS transmitted to the RX UE from the TX UE doesn't change during a long time. It is a question how the TX UE to determine the reference PSSCH DMRS transmit power for sidelink pathloss estimation, if the transmit power of the PSSCH DMRS transmitted to the RX UE from the TX UE changes.

In an alternative scheme, the TX UE may determine the reference PSSCH DMRS transmit power for sidelink pathloss estimation by performing an Exponential Weighted Moving Average (EWMA) of actual transmit power samples of the PSSCH DMRS transmitted to the RX UE by the TX UE during a period of time.

For example, the TX UE determines the reference PSSCH DMRS transmit power using the following EWMA equation, which is similar to the principle of the Layer 3 filter for RSRP:

$$P_n^{Ref} = (1-b)^{n-1} * P_1 + (1-b)^{n-2} * b * P_2 + \ldots + (1-b)^{n-j} * b * P_{n-j} + \ldots + (1-b) * b * P_{n-1} + b * P_n$$

Herein, $P_n^{Ref}$ is the reference PSSCH DMRS transmit power calculated at time point n, that is, the referenceSignalPower for sidelink pathloss estimation described above, $P_n$ is the actual transmit power of the PSSCH DMRS transmitted to the RX UE at time point n, corresponding weighting coefficient is b with a value scope of 0~1, $P_{n-j}$ is actual transmit power of the PSSCH DMRS transmitted to the RX UE at time point n-j, corresponding weighting coefficient is $(1-b)^{n-j} * b$.

In the EWMA equation, samples at different time points correspond to different weighting coefficients, and moving averages are obtained based on the different weighting coefficients. Wherein, the weighting coefficients for respective samples decrease exponentially over time, and the closer the sample is to the current time point, the bigger corresponding weighting coefficient is, that is, the closer the sample is to the current time point, the larger its contribution to the moving average is.

In the EWMA equation, the weighting coefficients for the actual transmit powers of the PSSCH DMRS transmitted to the RX UE at different time points are different, the weighting coefficient is associated with a distance to the time point n. The farther to the time point n the PSSCH DMRS is transmitted to the RX UE, the smaller the weighting coefficient for the actual transmit power is. The closer to time point n the PSSCH DMRS is transmitted to the RX UE, the bigger the weighting coefficient for the actual transmit power is.

It can be understand from the Layer 3 filter described above (in Embodiment Six) that the EWMA equation for determining the reference PSSCH DMRS transmit power is very similar to the principle of the Layer 3 filter. The parameter b in the EWMA equation for determining the reference PSSCH DMRS transmit power may be completely identical to the parameter a in the expression of the Layer 3 filter described above, namely, $b = a = \frac{1}{2}^{(k/4)}$, herein k is referred to as filter coefficient with a value scope of k 0, 1, 2, 3, 4, 5, 6, 7, 8, 9, 11, 13, 15, 17, 19, provided by the configuration parameter filterCoefficient-SL of the Layer 3 filter.

That is, the TX UE decides corresponding weighting coefficient based on the parameter configuration, filterCoefficient-SL, of Layer 3 filter used by the L3-RSRP reported by the RX UE, to determine the reference PSSCH DMRS transmit power, under a condition that the TX UE knows the parameter configuration of Layer 3 filter used by the L3-RSRP reported by the RX UE. In Embodiment Six, there are multiple configuration method for the filter parameter to realize the condition, for example, the TX UE configures the filterCoefficient-SL to the RX UE via PC5 RRC signaling, alternatively, the filterCoefficient-SL is configured based on resource pool.

Furthermore, a sample interval for determining the reference PSSCH DMRS transmit power may be completely identical to the sample interval for Layer 3 filter, that is, the sample period (X milliseconds) of Layer 3 filter described above, and the TX UE may provide one value of the actual transmit power of the PSSCH DMRS per X milliseconds as one input sample for the EWMA.

Alternatively, in order to improve accuracy of the sidelink pathloss estimation, the TX UE keeps the actual transmit power of the PSSCH DMRS as constant as possible during at least X milliseconds, then the value of the actual transmit power of the PSSCH DMRS can be considered as the input sample for the EWMA for determining the reference PSSCH DMRS transmit power during the X milliseconds. Even if the downlink pathloss and/or sidelink pathloss changes, the TX UE should ensure the actual transmit power of the PSSCH DMRS during the X milliseconds unchanged, and changes the actual transmit power of the PSSCH DMRS based on the changed downlink pathloss and/or sidelink pathloss after the X milliseconds, that is, the minimum time granularity for the TX UE adjusting the actual transmit power of the PSSCH DMRS is X milliseconds.

Alternatively, if the actual transmit power of the PSSCH DMRS changes during the X milliseconds due to the change of the downlink pathloss and/or sidelink pathloss, the value of the input sample for the EWMA for determining the reference PSSCH DMRS transmit power during the X milliseconds may depend on the implementation of the TX UE, for example, the TX UE may consider an average of the actual transmit powers of the PSSCH DMRS during the X milliseconds as the input sample described above.

Alternatively, assuming that at time point t the TX UE receives the L3-RSRP reported by the RX UE, the TX UE determines the reference PSSCH DMRS transmit power based on the EWMA of the actual transmit powers of the PSSCH DMRSs transmitted to the RX UE within a window [t−T2, t−T1] before time point t. Herein, T2 T1≥0, T1 and T2 may be predefined or preconfigured values, wherein the value for T1 may comprise physical consumption time for reporting L3-RSRP; or, the length of the window, T2-T1, is a predefined or preconfigured value, for example, the length of the window may be predefined or preconfigured as 10 seconds. If the TX UE doesn't transmit PSSCH to the RX UE in a first period within the window [t−T2, t−T1], the TX UE may only use the actual transmit powers of the PSSCH DMRS transmitted to the RX UE from the TX UE only in a subsequence period within the window [t−T2, t−T1], for the input sample.

Alternatively, assuming that at time point t the TX UE receives the L3-RSRP reported by the RX UE, the TX UE determines the reference PSSCH DMRS transmit power based on the EWMA of the transmit powers of the PSSCH DMRS transmitted to the RX UE within a window [t–0, t–T1] before time point t. Herein, T1≥0, T1 may be a predefined or preconfigured value, and the value of T1 may comprise a physical consumption time for reporting L3-RSRP; t0 is the time point at which the TX UE establishes a PC5 RRC connection with the RX UE, that is, the actual transmit powers of all PSSCH DMRS transmitted to the RX UE from the TX UE during a period of time from time point t0 at which the TX UE establishes the PC5 RRC connection with the RX UE, until the time point t–T1 before the L3-RSRP is received, are used for the EWMA.

The described-above method for determining the reference PSSCH DMRS transmit power by performing the EWMA of the actual transmit powers of the PSSCH DMRS may also be understood as determining the reference PSSCH DMRS transmit power by filtering the actual transmit powers of the PSSCH DMRS, an output of the filter is the reference PSSCH DMRS transmit power, and the filter for the PSSCH DMRS transmit power at the TX UE side may use the same filter configuration parameters as the Layer 3 filter of RSRP at the RX UE side.

Alternatively, physical layer (namely, Layer 1) at the TX UE determines the reference PSSCH DMRS transmit power by the above method, which is completely similar to the principle of the RSRP filtering of Layer 3 at the RX UE, but the Layers to which performing subjects belong are different, that is, the former is performed by Layer 1 at the TX UE while the latter is performed by Layer 3 at the RX UE. The method described above may also be referred to as Layer 1 filtering of the PSSCH DMRS transmit power.

Alternatively, the higher layer (namely Layer 3) at the TX UE determines the reference PSSCH DMRS transmit power by the method described above, which is completely similar to the principle of the RSRP filtering of Layer 3 at the RX UE, and the Layers to which performing subjects belong are also the same, that is, both are performed by Layer 3. The method described above may also be referred to as Layer 3 filtering of the PSSCH DMRS transmit power.

In another alternative scheme, the TX UE determines the reference PSSCH DMRS transmit power by performing the EWMA of the actual transmit powers of the PSSCH DMRSs, and the specific weighting coefficients depend on the implementation of the TX UE. That is, the TX UE determines the above-described reference PSSCH DMRS transmit power by the EWMA method similar to the principle of Layer 3 filtering of RSRP, and the TX UE may decide the weighting coefficients by using the filter parameter the same as that for Layer 3 filter used by the L3-RSRP reported by the RX UE; the TX UE may also decide the weighting coefficients by using different filter parameter from that for Layer 3 filter used by the L3-RSRP reported by the RX UE.

In a still further alternative scheme, how to determine the reference PSSCH DMRS transmit power depends on the implementation of the TX UE. For example, the TX UE may determine the reference PSSCH DMRS transmit power by the EWMA; or the TX UE may also calculate a linear weighted average of samples within a time window with a fixed length, and consider the obtained average as the reference PSSCH DMRS transmit power.

It is understood by those skilled in the art that the invention includes devices for performing one or more of the operations described in the present application. These devices may be specifically designed and manufactured for the purpose required, or may also include known devices in general-purpose computers. These devices have computer programs stored thereon that are selectively activated or reconstructed. Such computer programs may be stored in a device (for example, a computer) readable medium or in any type of medium suitable for storing electronic instructions and coupled to the bus respectively, the computer readable medium including, but not limited to, any type of disk (including soft disk, hard disk, optical disk, CD-ROM, and magneto-optical disk), ROM (read-only memory), RAM (random access memory), EPROM (erasable programmable read-only memory), EEPROM (electrically erasable programmable read-only memory), flash memory, magnetic card or light card. That is, the readable medium includes any medium in which information is stored or transmitted by a device (for example, a computer) in a readable form.

It can be understood by those skilled in the art that, each frame in these structure diagrams and/or block diagrams and/or flow diagrams and the combination of frames in these structure diagrams and/or block diagrams and/or flow diagrams can be implemented with computer program instructions. It can be understood by those skilled in the art that, these computer program instructions can be provided to a general-purpose computer, a professional computer or a processor of other programmable data processing methods to be implemented, in order that the scheme specified in the frame or multiple frames of the structure diagram and/or block diagram and/or flow diagram of the invention through the computer or the processor of other programmable data processing methods.

It can be understood by those skilled in the art that the steps, measures and schemes in various operations, methods and processes discussed in the invention can be alternated, changed, combined or deleted. Further, other steps, measures and schemes in various operations, methods and processes that have been discussed in the present invention can also be alternated, changed, rearranged, decomposed, combined or deleted. Further, the steps, measures and schemes in the various operations, methods and processes disclosed in the prior art and those disclosed in the present invention can also be alternated, changed, rearranged, decomposed, combined or deleted.

Above is only a part of the embodiments of the invention. It should be noted that for those ordinary skilled in the art, without departing from the principles of the invention, some improvements and refinements can be made, which improvements and refinements should also be regarded as the protection scope of the invention.

The invention claimed is:
1. A method performed by a first terminal in a communication system, the method comprising:
   transmitting, to a second terminal via sidelink (SL) radio resource control (RRC) signaling, one or more configurations for an SL channel state information reference signal (CSI-RS), wherein the one or more configurations indicate an antenna port configuration for the SL CSI-RS, a symbol position for the SL CSI-RS, and a frequency domain position for the SL CSI-RS,
   transmitting, to the second terminal, sidelink control information (SCI) including information associated with a triggering of an SL channel state information (CSI) report, wherein the information has one bit;
   transmitting, to the second terminal, the SL CSI-RS in case that the one bit of the information corresponds to a value that indicates the SL CSI report is triggered; and receiving, from the second terminal, the SL CSI report via a medium access control (MAC) control element (CE), wherein a priority of the MAC CE for the SL CSI report is fixed.

2. The method of claim 1, wherein the SL CSI report includes a rank indicator (RI) and channel quality indicator (CQI).

3. The method of claim 1, wherein a demodulation reference signal (DMRS) for a physical sidelink shared channel (PSSCH) or a physical sidelink control channel (PSCCH) is used for measuring a reference signal received power (RSRP).

4. The method of claim 1, wherein the SL CSI report triggered by the SCI is received within a time window from the triggering of the SL CSI report,
wherein the SL CSI report triggered by the SCI is not received after the time window from the triggering of the SL CSI report ends, and
wherein the time window is determined based on a number of slots.

5. The method of claim 1, wherein the SL CSI-RS is transmitted based on a frequency domain resource used for a physical shared channel (PSSCH) associated with the SCI.

6. A method performed by a second terminal in a communication system, the method comprising:
receiving, from a first terminal via sidelink (SL) radio resource control (RRC) signaling, one or more configurations for an SL channel state information reference signal (CSI-RS), wherein the one or more configurations indicate an antenna port configuration for the SL CSI-RS, a symbol position for the SL CSI-RS and a frequency domain position for the SL CSI-RS,
receiving, from the first terminal, sidelink control information (SCI) including information associated with a triggering of an SL channel state information (CSI) report, wherein the information has one bit;
receiving, from the first terminal, the SL CSI-RS in case that the one bit of the information corresponds to a value that indicates the SL CSI report is triggered by the information; and
transmitting, to the first terminal, the SL CSI report via a medium access control (MAC) control element (CE), wherein a priority of the MAC CE for the SL CSI report is fixed.

7. The method of claim 6, wherein the SL CSI report includes a rank indicator (RI) and channel quality indicator (CQI).

8. The method of claim 6, wherein a demodulation reference signal (DMRS) for a physical sidelink shared channel (PSSCH) or a physical sidelink control channel (PSCCH) is used for measuring a reference signal received power (RSRP).

9. The method of claim 6, wherein the SL CSI report triggered by the SCI is received within a time window from the triggering of the SL CSI report,
wherein the SL CSI report triggered by the SCI is not transmitted after the time window from the triggering of the SL CSI report ends, and
wherein the time window is determined based on a number of slots.

10. The method of claim 6, wherein the SL CSI-RS is received based on a frequency domain resource used for a physical shared channel (PSSCH) associated with the SCI.

11. A first terminal in a communication system, the first terminal comprising:
a transceiver; and
a controller configured to:
transmit, to a second terminal via sidelink (SL) radio resource control (RRC) signaling, one or more configurations for an SL channel state information reference signal (CSI-RS), wherein the one or more configurations indicate an antenna port configuration for the SL CSI RS, a symbol position for the SL CSI-RS and a frequency domain position for the SL CSI-RS,
transmit, to the second terminal, sidelink control information (SCI) including information associated with a triggering of an SL sidelink channel state information (CSI) report, wherein the information has one bit;
transmit, to the second terminal, the SL CSI-RS in case that the one bit of the information corresponds to a value that indicates the SL CSI report is triggered; and
receive, from the second terminal, the SL CSI via a medium access control (MAC) control element (CE), wherein a priority of the MAC CE for the SL CSI report is fixed.

12. A second terminal in a communication system, the second terminal comprising:
a transceiver; and
a controller configured to:
receive, from the first terminal via sidelink (SL) radio resource control (RRC) signaling, one or more configurations for an SL channel state information reference signal (CSI-RS), wherein the one or more configurations indicate an antenna port configuration for the SL CSI-RS, a symbol position for the SL CSI-RS and a frequency domain position for the SL CSI-RS,
receive, from the first terminal, sidelink control information (SCI) including information associated with a triggering of sidelink an SL channel state information (CSI) report, wherein the information has one bit;
receive, from the first terminal, the SL CSI-RS in case that the one bit of the information corresponds to a value that indicates the SL CSI report is triggered by the information; and
transmit, to the first terminal, the SL CSI report via a medium access control (MAC) control element (CE), wherein a priority of the MAC CE for the SL CSI report is fixed.

* * * * *